(12) United States Patent
Imafuku et al.

(10) Patent No.: US 9,772,035 B2
(45) Date of Patent: Sep. 26, 2017

(54) VEHICLE TRANSFER

(71) Applicant: TOYOTA JIDOSHA KABUSHIKI KAISHA, Toyota-shi, Aichi-ken (JP)

(72) Inventors: Mizuki Imafuku, Kariya (JP); Yuya Maruyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/340,247

(22) Filed: Nov. 1, 2016

(65) Prior Publication Data
US 2017/0130838 A1 May 11, 2017

(30) Foreign Application Priority Data
Nov. 11, 2015 (JP) ................................. 2015-221680

(51) Int. Cl.
| | |
|---|---|
| *F16H 59/00* | (2006.01) |
| *F16H 63/30* | (2006.01) |
| *F16H 25/22* | (2006.01) |
| *F16H 63/04* | (2006.01) |
| *F16H 37/06* | (2006.01) |
| *B60K 17/344* | (2006.01) |

(52) U.S. Cl.
CPC ......... *F16H 63/304* (2013.01); *B60K 17/344* (2013.01); *F16H 25/2204* (2013.01); *F16H 37/065* (2013.01); *F16H 63/04* (2013.01); *F16H 2063/3063* (2013.01)

(58) Field of Classification Search
CPC .. F16H 63/304; F16H 25/2204; F16H 37/065; F16H 63/04; B60K 17/344
See application file for complete search history.

(56) References Cited

U.S. PATENT DOCUMENTS

| | | | | |
|---|---|---|---|---|
| 5,984,821 | A * | 11/1999 | Showalter | B60K 17/3467 475/204 |
| 6,779,641 | B2 * | 8/2004 | Vonnegut | B60K 17/3505 180/247 |
| 2003/0032519 | A1 * | 2/2003 | Lovatt | F16D 7/027 475/204 |
| 2004/0162176 | A1 * | 8/2004 | Foster | B60K 17/3462 475/210 |

(Continued)

FOREIGN PATENT DOCUMENTS

JP 2016-074342 A 5/2016

*Primary Examiner* — Zakaria Elahmadi
(74) *Attorney, Agent, or Firm* — Oliff PLC

(57) ABSTRACT

A vehicle transfer includes an input shaft, an output shaft, an output member, a clutch, a motor, a screw mechanism, a transmitting mechanism, a fork shaft, an amplifying link mechanism, a high-low switching mechanism, and a fork. The fork shaft is configured to move in an axial direction of the fork shaft. The amplifying link mechanism is connected to the nut member and the fork shaft. The amplifying link mechanism is configured to amplify an amount of movement of the nut member in the direction of the common axis and transmit the amplified amount of movement to the fork shaft. The fork is connected to the fork shaft. The fork is configured to transmit moving force of the fork shaft to the high-low switching mechanism such that the high-low switching mechanism switches between the high-speed gear and the low-speed gear.

6 Claims, 17 Drawing Sheets

(56) References Cited

U.S. PATENT DOCUMENTS

| | | | |
|---|---|---|---|
| 2006/0011001 A1* | 1/2006 | Showalter | B60K 23/0808 |
| | | | 74/23 |
| 2007/0251345 A1 | 11/2007 | Kriebernegg et al. | |
| 2014/0041468 A1* | 2/2014 | Yukitake | F16H 61/32 |
| | | | 74/63 |
| 2016/0096429 A1* | 4/2016 | Imafuku | B60K 17/344 |
| | | | 180/233 |
| 2017/0037961 A1* | 2/2017 | Pritchard | F16H 61/18 |

* cited by examiner

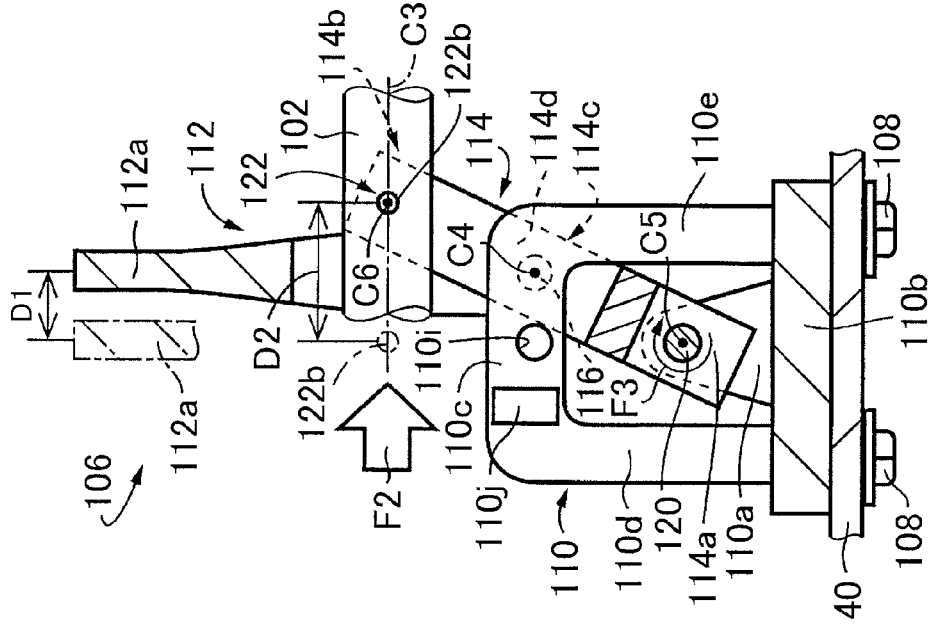
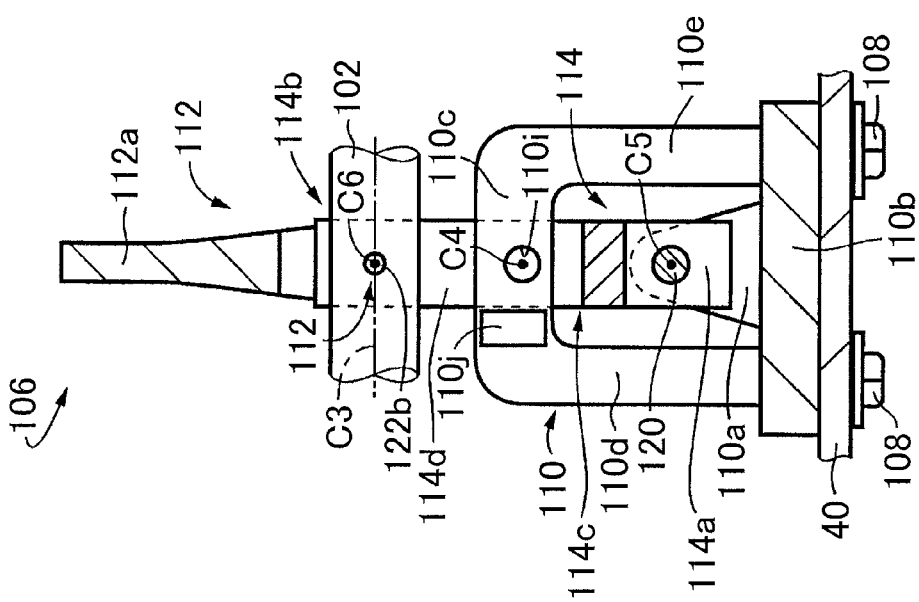

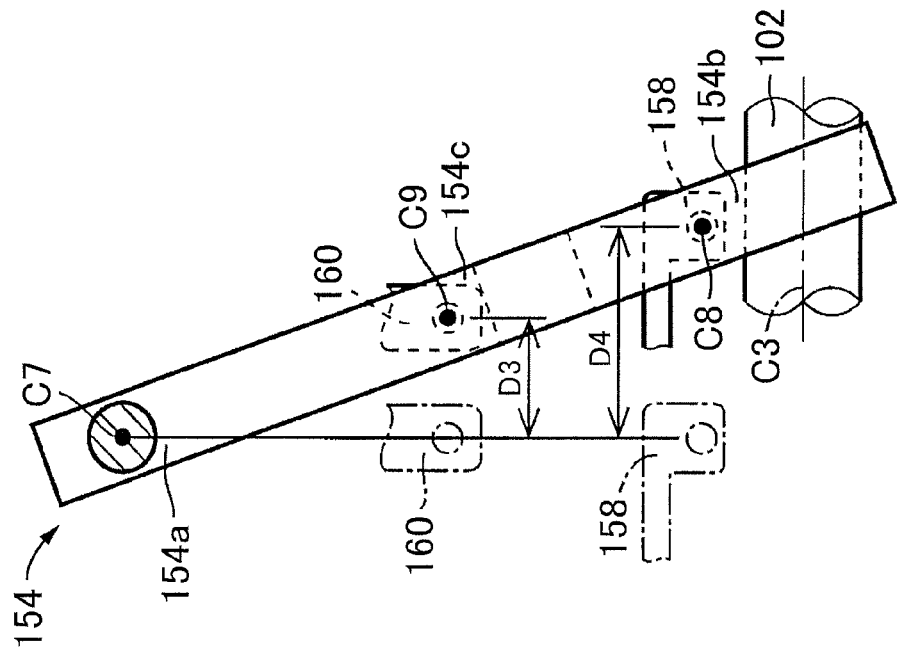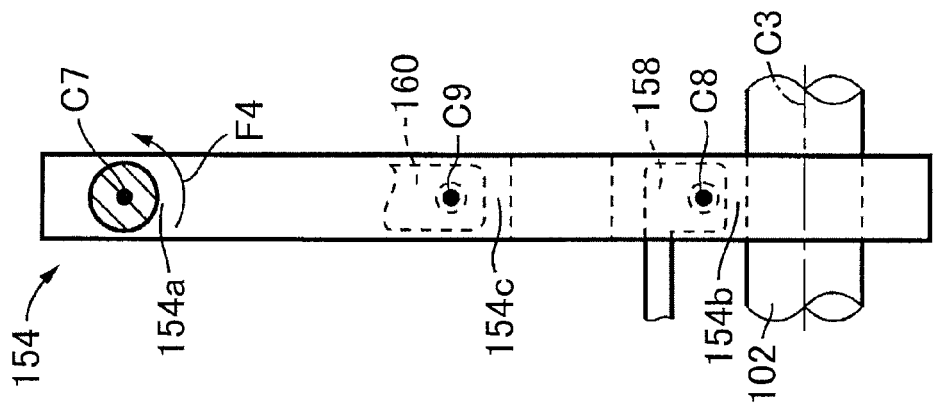

VEHICLE TRANSFER

INCORPORATION BY REFERENCE

The disclosure of Japanese Patent Application No. 2015-221680 filed on Nov. 11, 2015 including the specification, drawings and abstract is incorporated herein by reference in its entirety.

BACKGROUND

1. Technical Field

The present disclosure relates to a vehicle transfer that includes a high-low switching mechanism that changes the rate of rotation input from an input shaft and outputs the resultant rotation to an output shaft, and a clutch that transmits or interrupts the transmission of some of the power from the output shaft to an output member, or adjusts transfer torque to the output member.

2. Description of Related Art

For example, one known vehicle transfer includes an input shaft, an output shaft, a high-low switching mechanism that changes the rate of rotation input from the input shaft and outputs the resultant rotation to the output shaft, an output member that has a different power output destination than the output shaft, and a clutch that transmits or interrupts the transmission of some of the power from the output shaft to the output member, or adjusts transfer torque to the output member. The transfer described in US 2007/0251345 A is one such transfer. With the transfer for a four-wheel drive vehicle described in US 2007/0251345 A, the switching operation of the high-low switching mechanism and the adjustment of the transfer torque of the clutch are performed by a single motor. In the transfer described in US 2007/0251345 A, as a conversion mechanism that converts the rotation of the motor into linear motion, a drum cam system is employed for the switching operation of the high-low switching mechanism, and a ball cam and lever system is employed for adjusting the transfer torque of the clutch.

SUMMARY

Typically, a relatively long operation stroke is necessary with the high-low switching mechanism, and the clutch may have a comparatively short operation stroke, but relatively large thrust is required. On the other hand, the drum cam system described above does not provide enough thrust for the torque adjustment of the clutch, and the ball cam and lever system described above does not have a long enough stroke for the switch operation of the high-low switching mechanism. Therefore, it is difficult to employ the same system, i.e., only the drum cam system or only the ball cam and lever system, for both the switch operation of the high-low switching mechanism and the torque adjustment of the clutch. That is, both the drum cam system and the ball cam and lever system are able to convert the rotation of the motor into linear motion, but neither system is able to achieve provide both a long stroke and large thrust, so different systems must be employed, one for the switching operation of the high-low switching mechanism and one for the torque adjustment of the clutch, which may lead to an increase in the number of component parts, an increase in weight, an increase in cost, and deterioration in mountability due to an increase in the distance between axles.

The present disclosure thus provides a vehicle transfer in which the number of parts, the weight, the cost, and the size are able to be reduced compared to the related art.

One aspect of the present disclosure relates to a vehicle transfer that includes an input shaft, an output shaft, an output member, a clutch, a motor, a screw mechanism, a transmitting mechanism, a fork shaft, an amplifying link mechanism, a high-low switching mechanism, and a fork. The output shaft is arranged on a common axis with the input shaft. The output member is configured to output power to a different output destination than the output shaft. The clutch is configured to transmit or interrupt a transmission of some of the power of the output shaft from the output shaft to the output member, or adjust transfer torque that is transmitted from the output shaft to the output member. The screw mechanism includes a threaded shaft member and a nut member that are a pair of screw members. The screw mechanism is supported by the output shaft. The threaded shaft member and the nut member screw together. The screw mechanism is configured to rotatably drive one of the screw members, of the threaded shaft member and the nut member, with the motor such that the nut member moves in a direction of the common axis. The transmitting mechanism is configured to transmit a movement of the nut member that is in the direction of the common axis to the clutch. The fork shaft is arranged parallel to the output shaft. The fork shaft is configured to move in an axial direction of the fork shaft. The amplifying link mechanism is connected to the nut member and the fork shaft. The amplifying link mechanism is configured to amplify an amount of movement of the nut member in the direction of the common axis and transmit the amplified amount of movement to the fork shaft. The high-low switching mechanism is configured to change a rate of rotation of the input shaft and transmit a resultant rotation to the output shaft. The high-low switching mechanism includes a high-speed gear and a low-speed gear. The fork is connected to the fork shaft. The fork is configured to transmit moving force of the fork shaft to the high-low switching mechanism such that the high-low switching mechanism switches between the high-speed gear and the low-speed gear.

With the vehicle transfer according to this aspect, high thrust is able to be applied to the clutch via the transmitting mechanism by the relatively high boost function of the screw mechanism. Also, a stroke necessary to operate the high-low switching mechanism via the fork shaft and the fork is able to be obtained by moving the nut member in the direction of the common axis in the screw mechanism. As a result, both the switching operation of the high-low switching mechanism and the torque adjustment of the clutch are able to be performed with the same method, by using the screw mechanism as a conversion mechanism that converts the rotational motion of the motor into linear motion. As a result, the number of parts, the weight, the cost, and the size of the vehicle transfer are able to be reduced compared to the related art. Also, the amount of movement of the nut member in the direction of the common axis is amplified and transmitted to the fork shaft by the amplifying link mechanism, so the switching responsiveness of the high-low switching mechanism is increased.

In the vehicle transfer according to aspect described above, the amplifying link mechanism may include a shift member, an amplifying lever, and a fixed base. One end portion of the shift member may be connected to the nut member such that the one end portion of the shift member moves parallel to the direction of the common axis. Another end portion of the shift member may be connected to a longitudinally intermediate portion of the amplifying lever such that the other end portion of the shift member rotates relatively around a first axis that is orthogonal to the common axis. One end portion of the amplifying lever may be connected to the fixed base such that the one end portion of the amplifying lever rotates relatively around a second axis that is orthogonal to the common axis. Another end portion of the amplifying lever may be connected to the fork shaft such that the other end portion of the amplifying lever rotates relatively around a third axis that is orthogonal to the common axis. The amplifying link mechanism may be configured such that an amount of movement of the shift member in the direction of the common axis is amplified and becomes an amount of movement of the fork shaft in the axial direction of the fork shaft.

With the vehicle transfer according to this aspect, when the nut member is moved in the direction of the common axis, and the one end portion of the amplifying lever rotates around the second axis via the shift member, the amount of movement of the shift member in the direction of the common axis is amplified in relation to a ratio of a first distance from the one end portion of the amplifying lever to the longitudinally intermediate portion of the amplifying lever to which the other end portion of the shift member is connected, and a second distance from the one end portion of the amplifying lever to the other end portion of the amplifying lever, in the amplifying lever, and this amplified amount of movement is transmitted to the fork shaft.

The vehicle transfer according to the aspect described above may also include a locking mechanism configured to connect the output shaft and the output member together in a manner in which the output shaft and the output member are unable to rotate relative to each other around the common axis. The locking mechanism may be configured to be driven by the high-low switching mechanism. The shift member may be configured to move to an L4 position of the shift member, an H2 position of the shift member, and an H4 position of the shift member, by the movement of the nut member in the direction of the common axis. The L4 position of the shift member is a position of the shift member in which the low-speed gear is established in the high-low switching mechanism and the output shaft and the output member are connected together in a manner unable to rotate relative to each other around the common axis in the locking mechanism. The H2 position of the shift member is a position of the shift member in which the high-speed gear is established in the high-low switching mechanism and the transmission of some of the power of the output shaft to the output member is interrupted in the clutch. The H4 position of the shift member is a position in which the high-speed gear is established in the high-low switching mechanism and some of the power of the output shaft is transmitted to the output member in the clutch. The amplifying link mechanism may be configured to move the fork shaft in response to the shift member moving from the output shaft side to the input shaft side in the direction of the common axis such that the fork shaft switches between the L4 position of the fork shaft and the H2 position of the fork shaft.

With the vehicle transfer according to this aspect, the responsiveness with which the fork shaft switches between the L4 position and the H2 position is increased by the amplifying link mechanism.

In the vehicle transfer according to the aspect described above, the amplifying link mechanism may include a roller-shaped interlocking pin. The fixed base, the amplifying lever, and the shift member may be configured to each slidingly contact each other at a right angle to the axis of the fork shaft. A portion of the roller-shaped interlocking pin may be housed in a through-hole through the amplifying lever such that the roller-shaped interlocking pin moves in an axial direction of the roller-shaped interlocking pin. The shift member may include an engaging recessed portion that receives one end portion of the roller-shaped interlocking pin when the shift member is in a position from the L4 position of the shift member to the H2 position of the shift member. The fixed base may include an engaging recessed portion that receives another end portion of the roller-shaped interlocking pin when the shift member passes the H2 position of the shift member and is in the H4 position of the shift member. The fixed base may include a stopper. The amplifying link mechanism may be configured to urge the amplifying lever in the axial direction of the fork shaft with the shift member via the roller-shaped interlocking pin when the shift member is in a position from the L4 position of the shift member to the H2 position of the shift member, when the shift member moves from the L4 position of the shift member to the H4 position of the shift member. The amplifying link mechanism may be configured to stop movement of the amplifying lever with the stopper when the shift member passes the H2 position of the shift member, when the shift member moves from the L4 position of the shift member to the H4 position of the shift member.

With the vehicle transfer according to this aspect, when the shift member moves from the H2 position to the H4 position, the movement of the amplifying lever is stopped by the stopper, and in conjunction with this, the movement of the fork shaft and the fork is stopped, so when the high-speed gear is established in the high-low switching mechanism, the nut member is moved to the clutch side, and the linear motion of this nut member is able to be transmitted to the clutch via the transmitting mechanism. Also, loss when in 2WD is able to be reduced by providing relatively large clutch clearance with the clutch, in the H2 position, for example.

In the vehicle transfer according to the aspect described above, the clutch may be either a single disc clutch or a multiple disc clutch. The clutch may be configured to adjust the transfer torque to the output member.

With the vehicle transfer according to this aspect, continuously variable control of the transfer torque of the clutch is possible, which in turn makes driving force distribution control to the front wheels and the rear wheels that is even better suited to the driving conditions possible.

In the vehicle transfer according to this aspect, the nut member and the threaded screw member may screw together via a plurality of balls.

With the vehicle transfer according to this aspect, the relative rotation between the nut member and the threaded shaft member is smoother, so the power required of the motor during operation is stably reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 8A is a view of a state in which a shift member of the amplifying link mechanism has been moved, and shows a state in which the shift member is an H2 position;

FIG. 8B is a view of a state in which the shift member of the amplifying link mechanism has been moved, and shows a state in which the shift member is an L2 position;

FIG. 13A is a sectional view taken along line XIII-XIII in FIG. 12, which shows the state of the amplifying link mechanism when a nut member is moved, and shows a state in which a second connecting member to which the nut member is connected is in the H2 position; and FIG. 13B is a sectional view taken along line XIII-XIII in FIG. 12, which shows the state of the amplifying link mechanism when the nut member is moved, and shows a state in which the second connecting member is in the L4 position.

DETAILED DESCRIPTION OF EMBODIMENTS

Hereinafter, example embodiments of the present disclosure will be described with reference to the accompanying drawings. The drawings described in the example embodiments below have been simplified or modified as appropriate, so the scale ratios and the shapes and the like of the portions are not always accurately depicted.

Figure 1:
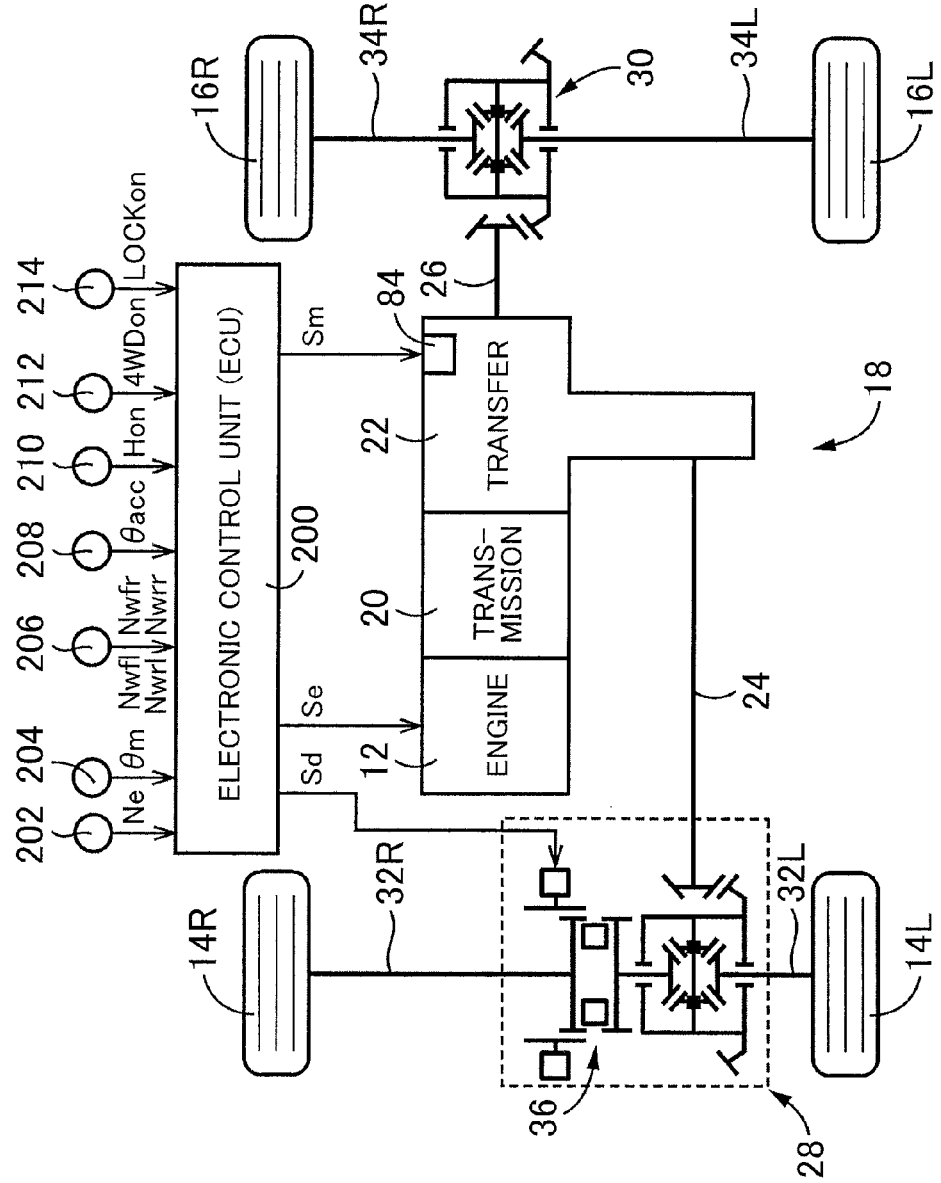
FIG. 1 is a view schematically showing the structure of a vehicle to which the present disclosure may be applied, and shows the main portions of a control system for various controls in the vehicle.

FIG. 1 is a view schematically showing the structure of a vehicle 10 to which the present disclosure may be applied, and illustrates the main portions of a control system for various controls in the vehicle 10. As shown in FIG. 1, the vehicle 10 includes an engine 12 as a driving force source, left and right front wheels 14L and 14R (simply referred to as "front wheels 14" unless otherwise specified), left and right rear wheels 16L and 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel drive (2WD) and when running in four-wheel drive (4WD). The front wheels 14 are auxiliary driving wheels that are driven wheels when running in 2WD and are driving wheels when running in 4WD. Therefore, the vehicle 10 is a front engine rear wheel drive (FR)-based four-wheel drive vehicle.

The power transmitting apparatus 18 includes a transmission 20, a transfer (vehicle transfer) 22 for a four-wheel drive vehicle, a front propeller shaft 24 and a rear propeller shaft 26, a front wheel differential gear unit 28, a rear wheel differential gear unit 30, left and right front wheel axles 32L and 32R (simply referred to as "front wheel axles 32" unless otherwise specified), and left and right rear wheel axles 34L and 34R (simply referred to as "rear wheel axles 34" unless otherwise specified), and the like. The transmission 20 is connected to the engine 12. The transfer 22 is a front-rear wheel power transfer (i.e., a front-rear wheel power distributing device) that is connected to the transmission 20. The front propeller shaft 24 and the rear propeller shaft 26 are both connected to the transfer 22. The front wheel differential gear unit 28 is connected to the front propeller shaft 24. The rear wheel differential gear unit 30 is connected to the rear propeller shaft 26. The front wheel axles 32 are connected to the front wheel differential gear unit 28. The rear wheel axles 34 are connected to the rear wheel differential gear unit 30. In the power transmitting apparatus 18 structured in this way, power from the engine 12 that has been transmitted to the transfer 22 via the transmission 20 is then transmitted from the transfer 22 to the rear wheels 16 via a power transmitting path on the rear wheel 16 side that includes the rear propeller shaft 26, the rear wheel differential gear unit 30, and the rear wheel axles 34 and the like in this order. Also, some of the power from the engine 12 that is to be transmitted to the rear wheel 16 side is distributed to the front wheel 14 side by the transfer 22, and transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a mesh-type clutch that is electrically (electromagnetically) controlled and selectively connects or disconnects the power transmitting path between the front wheel differential gear unit 28 and the front wheel 14R. The front-side clutch 36 may also be provided with a synchronizing mechanism (a synchro mechanism).

Figure 2:
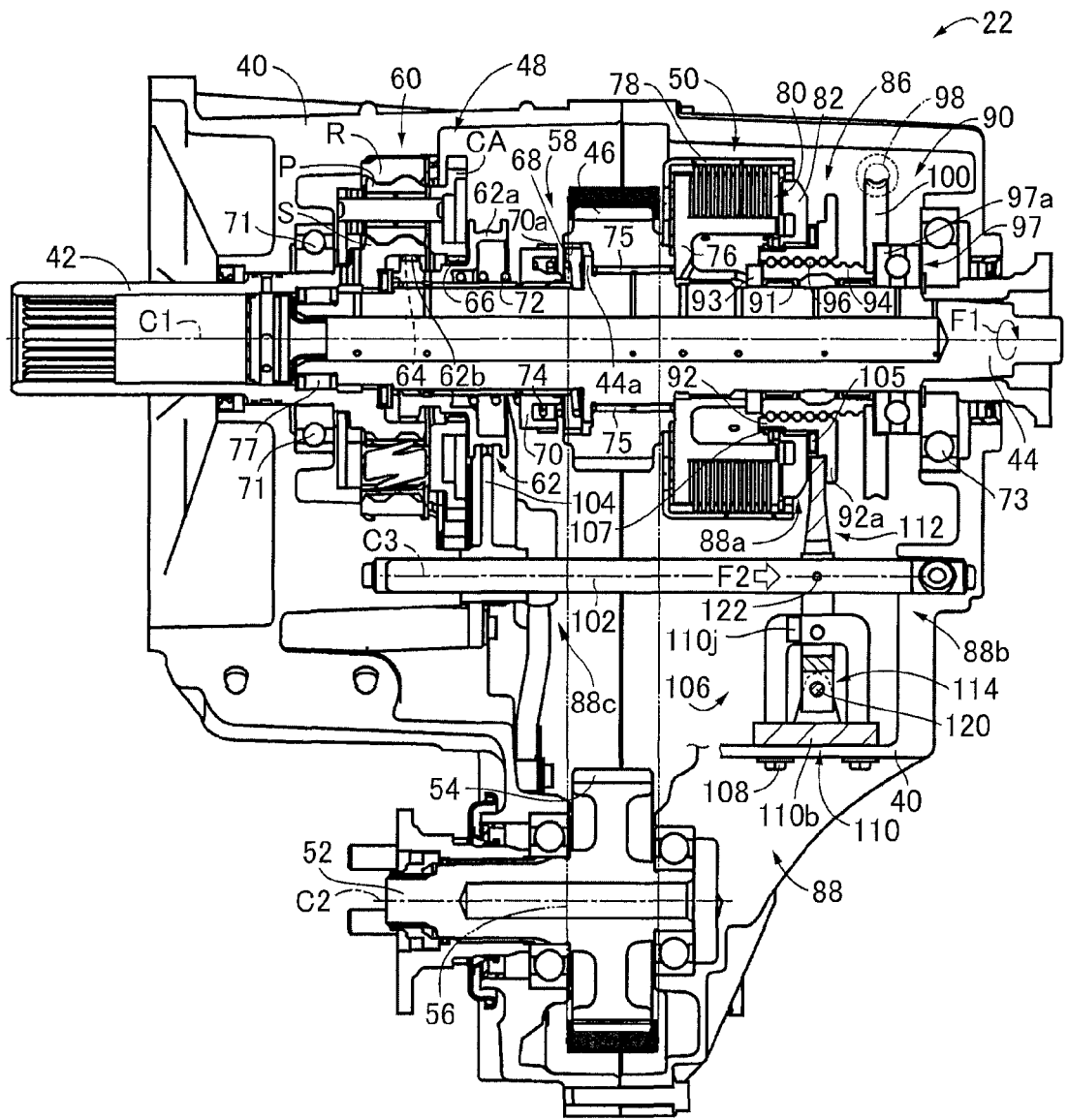
FIG. 2 is a sectional view schematically showing the structure of a transfer, and illustrating a 2WD running state in a high-speed gear.
Figure 3:
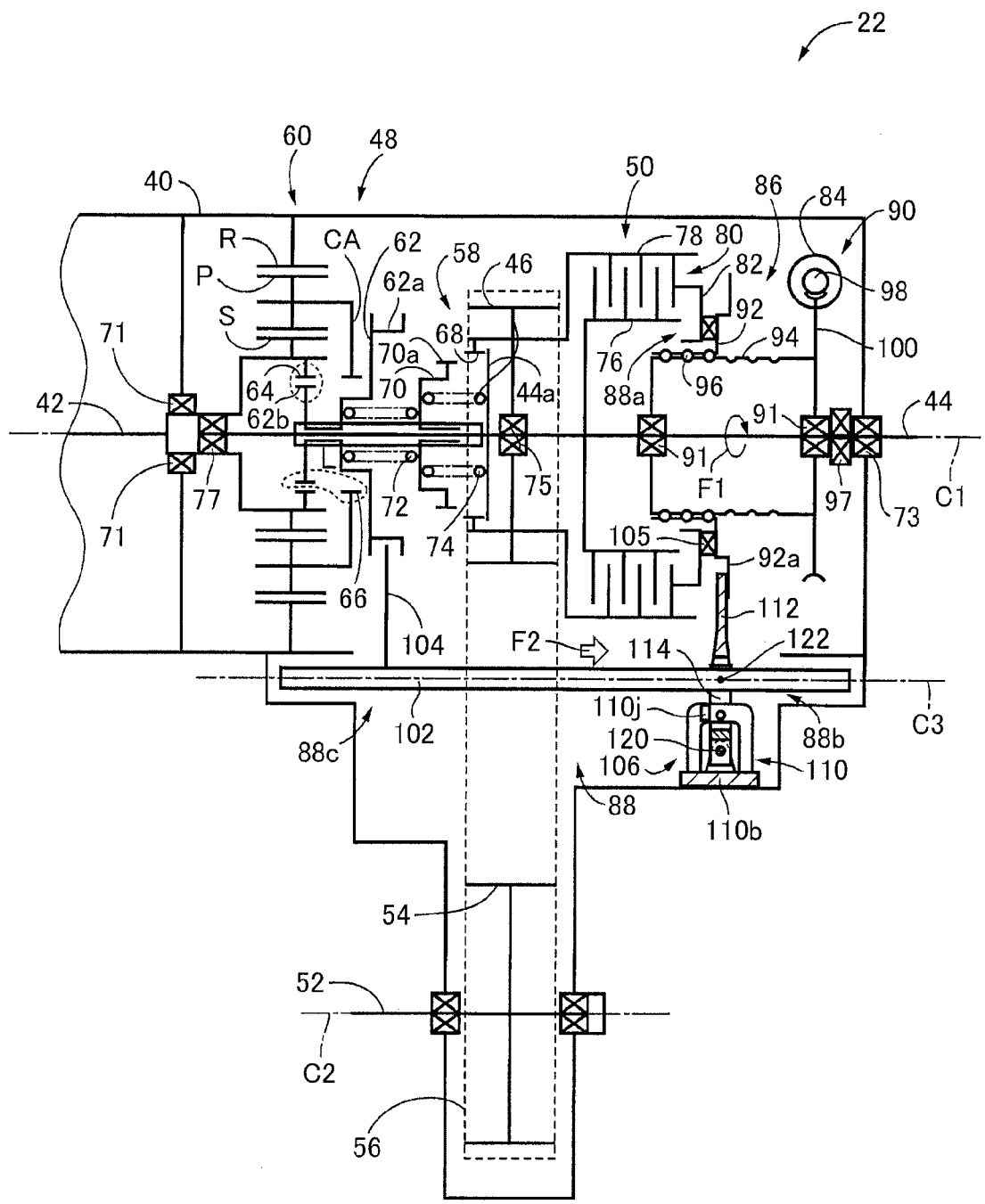
FIG. 3 is a skeleton view illustrating the general structure of the transfer.
Figure 4:
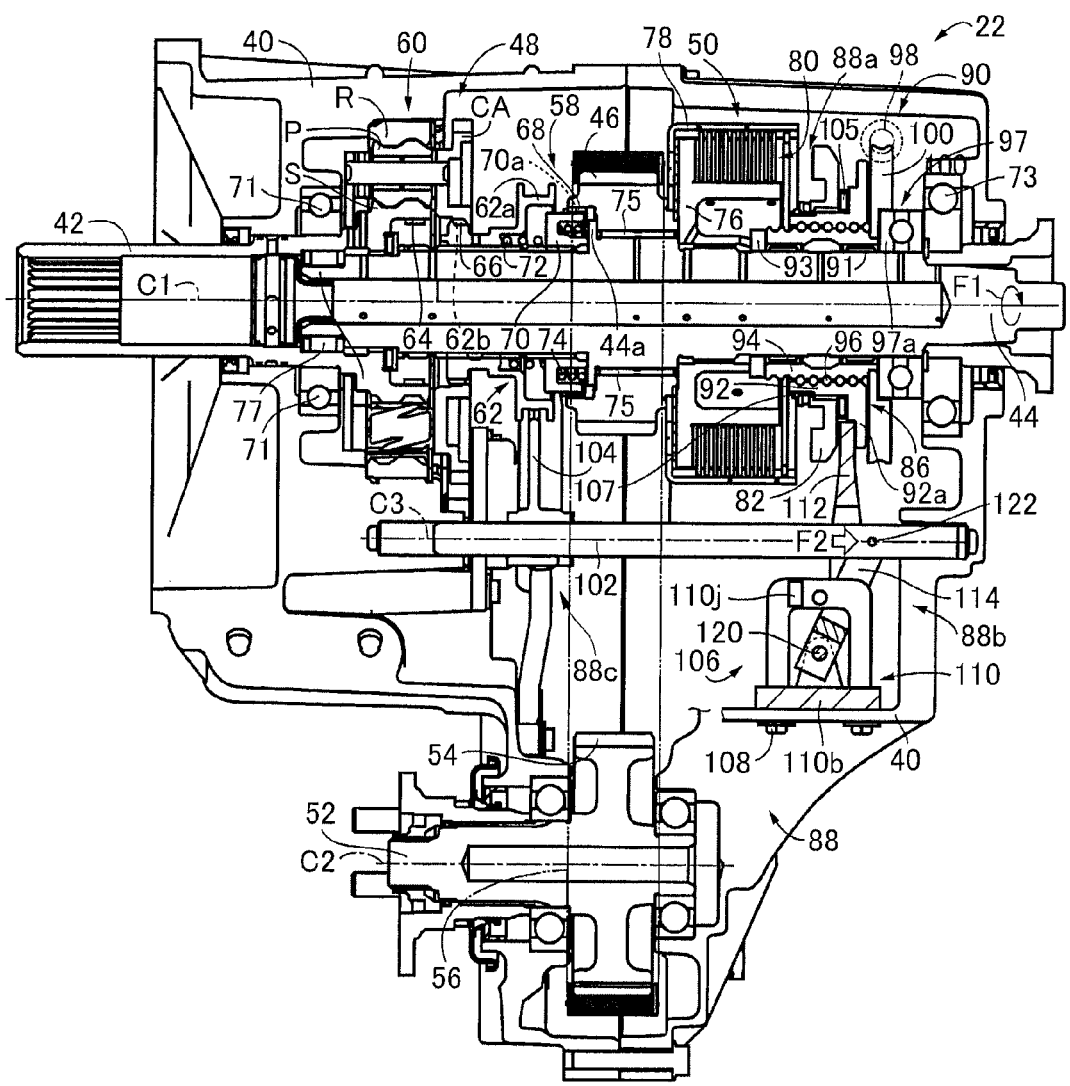
FIG. 4 is a sectional view schematically showing the structure of the transfer, and illustrating a 4WD running state in a 4WD locked state in a low-speed gear.

FIGS. 2 to 4 are views schematically showing the structure of the transfer 22. FIGS. 2 and 4 are sectional views of the transfer 22, and FIG. 3 is a skeleton view of the transfer 22. As shown in FIGS. 2 to 4, the transfer 22 includes a transfer case 40 as a non-rotating member. The transfer 22 includes, all around a common first axis (common axis) C1, an input shaft 42 that is rotatably supported by the transfer case 40, a rear-wheel side output shaft (output shaft) 44 that outputs power to the rear wheels 16 that serve as first left and right driving wheels, a sprocket-shaped drive gear (output member) 46 that outputs power to the front wheels 14 that serve as second left and right driving wheels, i.e., that has a different power output destination than the rear-wheel side output shaft 44, a high-low switching mechanism 48 as an auxiliary transmission that changes the rate of rotation input from the input shaft 42 and transmits the resultant rotation to the rear-wheel side output shaft 44, and a front-wheel drive clutch (clutch) 50 as a multiple disc friction clutch (multiple disc clutch) that adjusts the transfer torque transmitted from the rear-wheel side output shaft 44 to the drive gear 46, i.e., that transmits some of the power of the rear-wheel side output shaft 44 to the drive gear 46. The input shaft 42 and the rear-wheel side output shaft 44 are supported by the transfer case 40 via a pair of bearings, i.e., a first support bearing 71 and a second support bearing 73, so as to each be able to rotate around the same axis mutually. The drive gear 46 is supported by the rear-wheel side output shaft 44 via a third support bearing 75 in a manner concentric with, and able to rotate relative to, the rear-wheel side output shaft 44. That is, the input shaft 42, the rear-wheel side output shaft 44, and the drive gear 46 are each supported by the transfer case 40 so as to be able to rotate around the first axis C1. That is, the input shaft 42, the rear-wheel side output shaft 44, and the drive gear 46 are all arranged on the common first axis C1. With the rear-wheel side output shaft 44, front-side end portion of the rear-wheel side output shaft 44 is rotatably supported by a bearing 77 that is arranged between a rear-side end portion of the input shaft 42 and the front-side end portion of the rear-wheel side output shaft 44, and a rear-side end portion of the rear-wheel side output shaft 44 is rotatably supported by the second support bearing 73.

As shown in FIGS. 2 to 4, the transfer 22 includes, inside the transfer case 40 and around a common second axis C2 that is parallel to the first axis C1, a front-wheel side output shaft 52, and a sprocket-shaped driven gear 54 integrally provided on the front-wheel side output shaft 52. Furthermore, the transfer 22 includes a front-wheel drive chain 56 that is wound around between the drive gear 46 and the driven gear 54, and a 4WD locking mechanism (locking mechanism) 58 as a dog clutch that connects the rear-wheel side output shaft 44 and the drive gear 46 together in a manner such that they are unable to rotate relative to one another around the first axis C1.

The input shaft 42 is connected to an output shaft, not shown, of the transmission 20, via a coupling, and is rotatably driven by driving force (torque) input from the engine 12 via the transmission 20. The rear-wheel side output shaft 44 is a main drive shaft that is connected to the rear propeller shaft 26. The drive gear 46 is provided in a manner able to rotate relatively around the rear-wheel side output shaft 44. The front-wheel side output shaft 52 is an auxiliary drive shaft that is connected to the front propeller shaft 24 via a coupling, not shown.

The transfer 22 structured in this way adjusts the transfer torque transmitted to the drive gear 46 with the front-wheel drive clutch 50, and transmits the power transmitted from the transmission 20 to only the rear wheels 16, or distributes it to the front wheels 14 as well. Also, the transfer 22 switches between a 4WD locked state that prevents differential rotation between the rear propeller shaft 26 and the front propeller shaft 24, and a 4WD unlocked state that allows differential rotation between these, by the 4WD locking mechanism 58. Also, the transfer 22 establishes one of a high-speed gear (a high-speed speed) H and a low-speed gear (a low-speed speed) L, and changes the rate of rotation input from the transmission 20 and transmits the resultant rotation downstream. That is, the transfer 22 transmits the rotation of the input shaft 42 to the rear-wheel side output shaft 44 via the high-low switching mechanism 48. Also, when transfer torque through the front-wheel drive clutch 50 is zero and the 4WD locking mechanism 58 is released, power is not transmitted from the rear-wheel side output shaft 44 to the front-wheel side output shaft 52. On the other hand, when torque is transmitted through the front-wheel drive clutch 50 or the 4WD locking mechanism 58 is engaged, power is transmitted from the rear-wheel side output shaft 44 to the front-wheel side output shaft 52 via the drive gear 46, the front-wheel drive chain 56, and the driven gear 54.

More specifically, the high-low switching mechanism 48 includes a single pinion planetary gear set 60 and a high-low sleeve 62. The planetary gear set 60 includes a sun gear S that is connected to the input shaft 42 in a manner such that the sun gear S is unable to rotate around the first axis C1 with respect to the input shaft 42, a ring gear R that is arranged substantially concentric with the sun gear S and is connected to the transfer case 40 in a manner such that the ring gear R is unable to rotate around the first axis C1, and a carrier CA that rotatably supports a plurality of pinion gears P that are in mesh with the sun gear S and the ring gear R, in a manner that enables the pinion gears P to revolve around the sun gear S. Therefore, the rotation speed of the sun gear S is the same as that of the input shaft 42, and the rotation speed of the carrier CA is slower than that of the input shaft 42. Also, high-side gear teeth 64 are fixed on an inner peripheral surface of this sun gear S, and low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed gear H. The low-side gear teeth 66 are spline teeth that output rotation at a slower speed than the high-side gear teeth 64 and are involved with establishing the low-speed gear L. The high-low sleeve 62 is spline engaged with the rear-wheel side output shaft 44 in a manner able to move relative to the rear-wheel side output shaft 44 in a direction parallel to the first axis C1. The high-low sleeve 62 has a fork connecting portion 62a, and outer peripheral teeth 62b that are integrally provided adjacent to the fork connecting portion 62a and mesh with the high-side gear teeth 64 and the low-side gear teeth 66 by the high-low sleeve 62 moving in the direction parallel to the first axis C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed gear clutch for establishing the high-speed gear H, and the low-side gear teeth 66 and the high-low sleeve 62 function as a low-speed gear clutch for establishing the low-speed gear L.

The 4WD locking mechanism 58 has locking teeth 68 fixed on an inner peripheral surface of the drive gear 46, and a locking sleeve 70 that is spline engaged with the rear-wheel side output shaft 44 so as to be able to move in the direction of the first axis C1 with respect to the rear-wheel side output shaft 44 but unable to rotate relative to the rear-wheel side output shaft 44, and has, fixed to an outer peripheral surface thereof, outer peripheral teeth 70a that mesh with the locking teeth 68 formed on the drive gear 46 when the locking sleeve 70 moves in the direction of the first axis C1. In the transfer 22, when the 4WD locking mechanism 58 is in an engaged state in which the outer peripheral teeth 70a of the locking sleeve 70 are in mesh with the locking teeth 68, the rear-wheel side output shaft 44 and the drive gear 46 are connected so as to be unable to rotate relative to each other around the first axis C1, such that 4WD locked state is established.

The high-low sleeve 62 is provided in a space on the drive gear 46 side of the first support bearing 71 provided on the input shaft 42 (more specifically, in a space on the drive gear 46 side of the planetary gear set 60). The locking sleeve 70 is provided separate from and adjacent to the high-low sleeve 62, in a space between the high-low switching mechanism 48 and the drive gear 46. The transfer 22 is provided with a preloaded first spring 72 between the high-low sleeve 62 and the locking sleeve 70. This first spring 72 is abutted against the high-low sleeve 62 and locking sleeve 70, and urges the high-low sleeve 62 and the locking sleeve 70 away from each other. The transfer 22 is also provided with a preloaded second spring 74 between the drive gear 46 and the locking sleeve 70. This second spring 74 is abutted against a protruding portion 44a of the rear-wheel side output shaft 44 and the locking sleeve 70, and urges the locking sleeve 70 toward the side away from the locking teeth 68. The urging force of the first spring 72 is set larger than the urging force of the second spring 74. The protruding portion 44a is a flange portion of the rear-wheel side output shaft 44 that is provided protruding on the locking teeth 68 side in a space on the radially inner side of the drive gear 46. The high-side gear teeth 64 are provided in a position farther away from the locking sleeve 70 than the low-side gear teeth 66 when viewed in a direction parallel to the first axis C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The outer peripheral teeth 70a of the locking sleeve 70 mesh with the locking teeth 68 on the side where the locking sleeve 70 moves toward the drive gear 46 (i.e., on the right side in FIGS. 2 and 3). Therefore, the outer peripheral teeth 70a of the locking sleeve 70 mesh with the locking teeth 68 when the high-low sleeve 62 is in the position in which the outer peripheral teeth 62b of the high-low sleeve 62 mesh with the low-side gear teeth 66.

The front-wheel drive clutch 50 is a multiple disc friction clutch that includes a clutch hub 76 that is connected to the rear-wheel side output shaft 44 in a manner unable to rotate relative to the rear-wheel side output shaft 44, a clutch drum 78 that is connected to the drive gear 46 in a manner unable to rotate relative to the drive gear 46, a friction engagement element 80 that is interposed between the clutch hub 76 and the clutch drum 78 and selectively engages and disengages the clutch hub 76 and the clutch drum 78, and a piston 82 that presses on the friction engagement element 80. The front-wheel drive clutch 50 is arranged around the first axis C1 of the rear-wheel side output shaft 44, on the side opposite the high-low switching mechanism 48 with respect to the drive gear 46 in the direction of the first axis C1 of the rear-wheel side output shaft 44. The friction engagement element 80 is pressed on by the piston 82 that moves toward the drive gear 46 side. The front-wheel drive clutch 50 is placed in a released state when the piston 82 is moved toward the non-pressing side (i.e., the right side in FIGS. 2 and 3) that is the side away from the drive gear 46 in a direction parallel to the first axis C1, and is not abutting against the friction engagement element 80. On the other hand, the front-wheel drive clutch 50 is placed in a slip state or an engaged state by the transfer torque (torque capacity) being adjusted by the amount of movement of the piston 82, when the piston 82 is moved toward the pressing side (i.e., the left side in FIGS. 2 and 3) that is the side closer to the drive gear 46 in a direction parallel to the first axis C1, and is abutting against the friction engagement element 80.

When the front-wheel drive clutch 50 is in the released state and the 4WD locking mechanism 58 is in a released state in which the outer peripheral teeth 70a of the locking sleeve 70 are not in mesh with the locking teeth 68, the power transmitting path between the rear-wheel side output shaft 44 and the drive gear 46 is interrupted such that the transfer 22 transmits the power transmitted from the transmission 20 to only the rear wheels 16. When the front-wheel drive clutch 50 is in the slip state or the engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the drive gear 46, such that a differential state (4WD unlocked state) is established in the transfer 22. When the front-wheel drive clutch 50 is in the engaged state, the rear-wheel side output shaft 44 and the drive gear 46 rotate together as a unit, such that the 4WD locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the 4WD locking mechanism 58, an electric motor (motor) 84 (see FIG. 3), a screw mechanism 86 that converts the rotational motion of the electric motor 84 into linear motion, and a transmitting mechanism 88 that transmits the linear motion force of the screw mechanism 86 to the high-low switching mechanism 48, the front-wheel drive clutch 50, and the 4WD locking mechanism 58.

Figure 6:
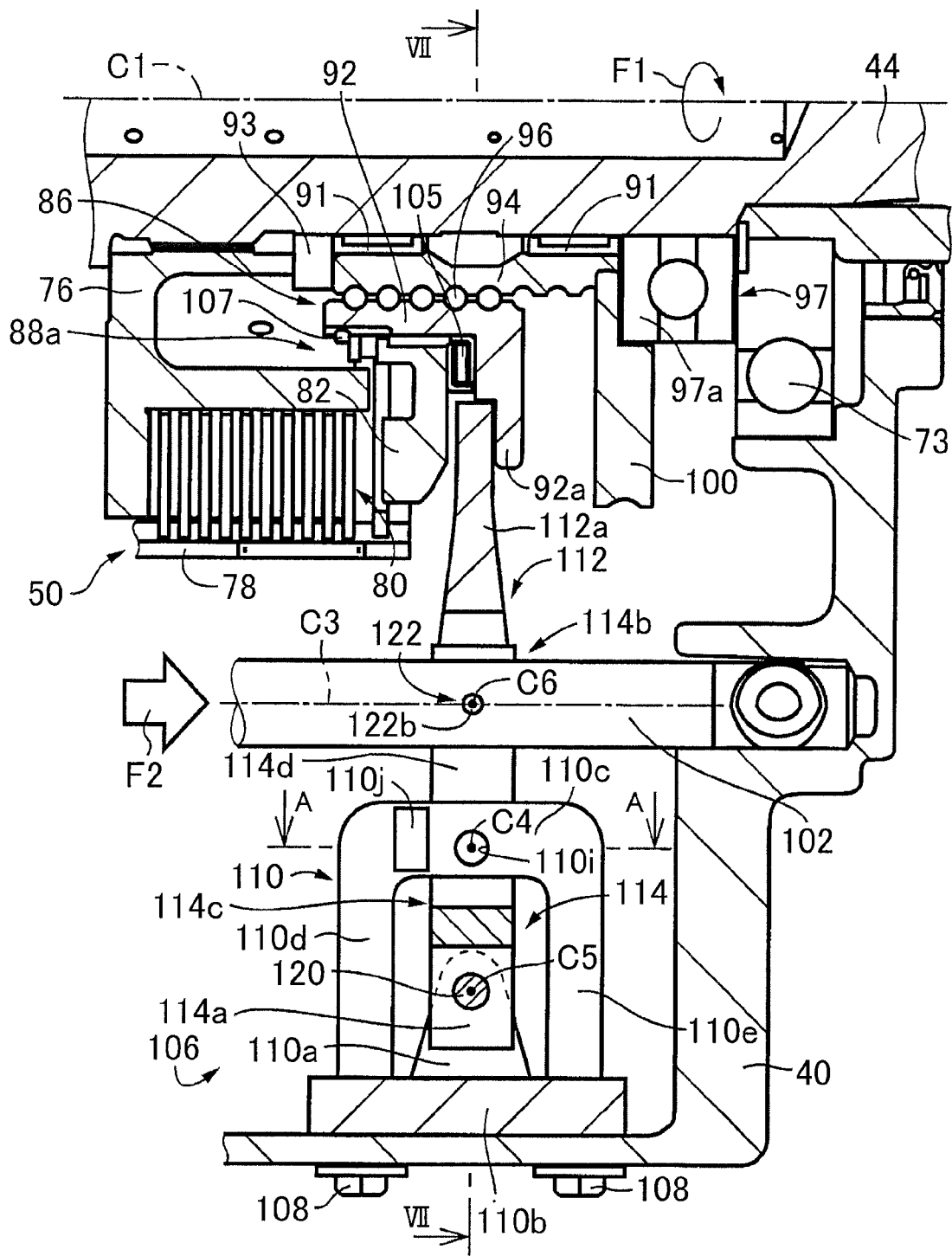
FIG. 6 is an enlarged view of FIG. 2, illustrating the amplifying link mechanism provided in the transfer.

The screw mechanism 86 is arranged around the same first axis C1 as the rear-wheel side output shaft 44, on the side opposite the drive gear 46 with respect to the front-wheel drive clutch 50, and includes a threaded shaft member (one screw member) 94 as a rotating member that is indirectly connected to the electric motor 84 via a worm gear 90 provided in the transfer 22, and a nut member (another screw member) 92 that screws together with the threaded shaft member 94. The nut member 92 screws together with the threaded shaft member 94 via a plurality of balls 96. The screw mechanism 86 is a ball screw in which the nut member 92 and the threaded shaft member 94 operate via the plurality of balls 96. With the screw mechanism 86 structured in this way, the nut member 92 moves in the direction of the first axis C1 of the rear-wheel side output shaft 44 by the threaded shaft member 94, which is one of the screw members, of the threaded shaft member 94 and the nut member 92 that are supported by the rear-wheel side output shaft 44 and screw together, being rotatably driven by the electric motor 84. The nut member 92 moves in the direction of the first axis C1 of the rear-wheel side output shaft 44. A bearing 91 is interposed between the threaded shaft member 94 and the rear-wheel side output shaft 44. A stopper 93 that abuts against an end portion on the drive gear 46 side of the threaded shaft member 94, and thrust bearing 97 that abuts against the end portion of the threaded shaft member 94 that is on the side opposite the drive gear 46 side, are provided one on each side of the threaded shaft member 94. The threaded shaft member 94 is supported on the rear-wheel side output shaft 44 in a manner in which the threaded shaft member 94 is able to rotate around the first axis C1 but unable to move in the direction of the first axis C1, by the bearing 91, the stopper 93, and the thrust bearing 97. The nut member 92 is supported on the rear-wheel side output shaft 44 in a manner in which the nut member 92 is able to rotate around the first axis C1 and able to move in the direction of the first axis C1, by the nut member 92 screwing onto the threaded shaft member 94. Also, in this example embodiment, when the threaded shaft member 94 is rotated in the direction of arrow F1 around the first axis C1 by the electric motor 84 as shown in FIGS. 2 and 6, the nut member 92 moves in a direction away from the front-wheel drive clutch 50 in the direction of the first axis C1, i.e., in the direction of arrow F2, by the screwing action with the threaded shaft member 94.

The worm gear 90 is a gear pair that includes a worm 98 integrally formed on a motor shaft of the electric motor 84, and a worm wheel 100 that meshes with the worm 98. An inner peripheral portion of the worm wheel 100 is fixed to the end portion of the threaded shaft member 94 that is on the side opposite the drive gear 46 side, and an annular member 97a on the drive gear 46 side of the thrust bearing 97. For example, rotation of the electric motor 84 that is a brushless motor or the like is reduced in speed and transmitted to the threaded shaft member 94 via the worm gear 90. The screw mechanism 86 converts the rotation of the electric motor 84 transmitted to the threaded shaft member 94 into linear motion of the nut member 92.

The transmitting mechanism 88 includes a first transmitting mechanism (transmitting mechanism) 88a that transmits the linear motion of the nut member 92 of the screw mechanism 86 to the front-wheel drive clutch 50, and a second transmitting mechanism 88b that transmits linear motion of the nut member 92 of the screw mechanism 86 to the high-low switching mechanism 48.

As shown in FIGS. 2 to 4, the first transmitting mechanism 88a includes a piston 82 that presses on the friction engagement element 80 of the front-wheel drive clutch 50, a thrust bearing 105 interposed between the piston 82 and a flange portion 92a of the nut member 92, and a stopper member 107 that prevents relative movement of the piston 82 toward the friction engagement element 80 side with respect to the nut member 92. The piston 82 is connected to the nut member 92 in a manner unable to relatively move in the first axis C1 direction with respect to the nut member 92 and able to relatively rotate around the first axis C1 with respect to the nut member 92, by the thrust bearing 105 and the stopper member 107. As a result, the linear motion of the nut member 92 of the screw mechanism 86 is transmitted to the friction engagement element 80 of the front-wheel drive clutch 50 via the first transmitting mechanism 88a.

Also, as shown in FIGS. 2 to 4, the second transmitting mechanism 88b includes a fork shaft 102 that is arranged parallel to the rear-wheel side output shaft 44 and is supported so as to be able to move in the direction of a third axis (axis) C3 in the transfer case 40, and a fork 104 that is connected to the fork shaft 102 and the high-low sleeve 62, and transmits the moving force of the fork shaft 102 to the high-low switching mechanism 48 via the high-low sleeve 62. The second transmitting mechanism 88b also includes, in a power transmitting path between the screw mechanism 86 and the fork shaft 102, an amplifying link mechanism 106 that is connected to the nut member 92, and amplifies the amount of movement of the nut member 92 in the direction of the first axis C1, and transmits the amplified amount of movement to the fork shaft 102. In the second transmitting mechanism 88b, the high-low sleeve 62 is moved by the high-low switching mechanism 48, by the moving force of the nut member 92 in the direction of the first axis C1, which is transmitted by the fork 104 via the fork shaft 102 and the amplifying link mechanism 106, such that there is a switch between high-speed gear H and the low-speed gear L.

Figure 5:
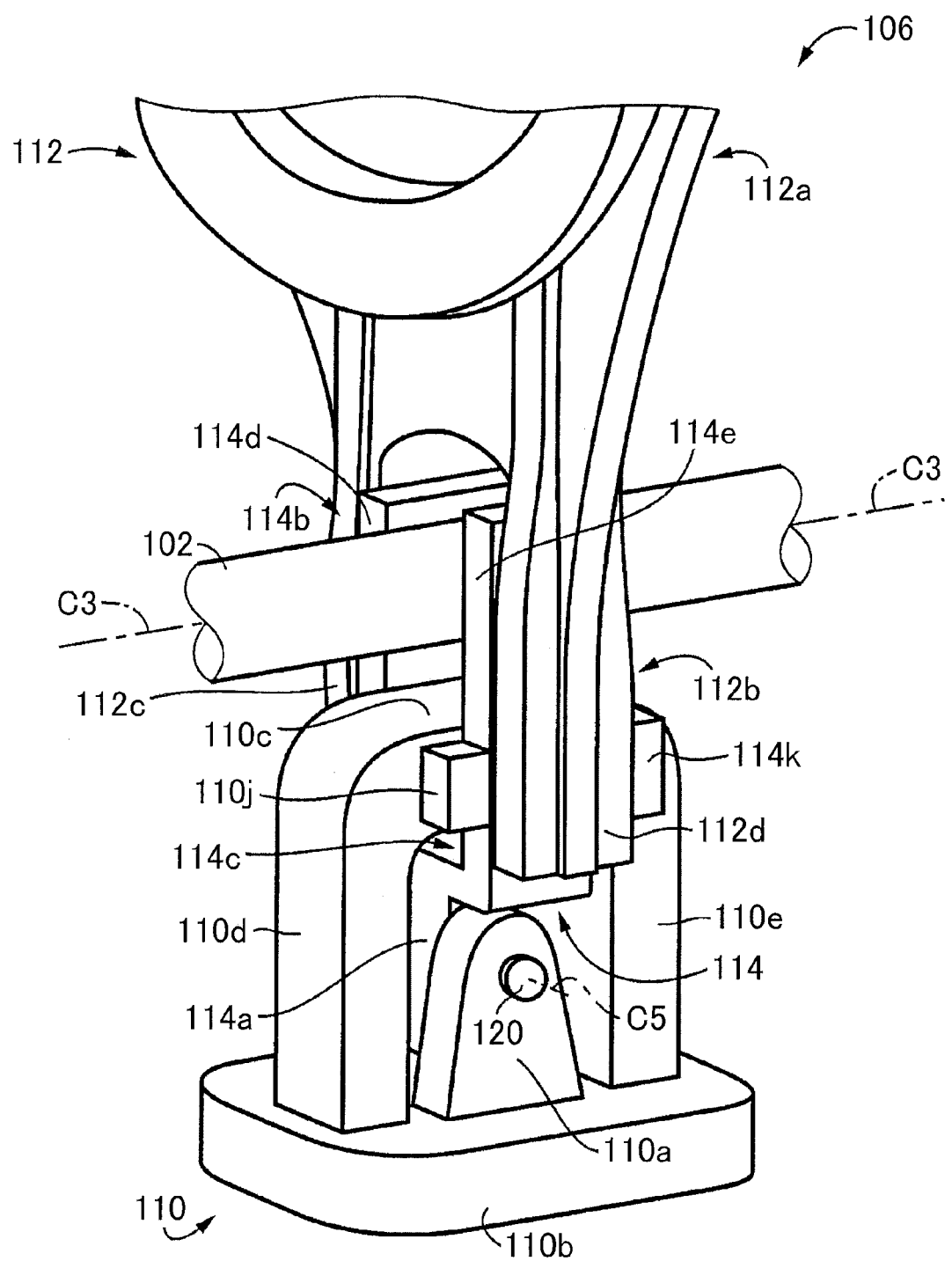
FIG. 5 is a perspective view illustrating an amplifying link mechanism provided in the transfer.
Figure 7:
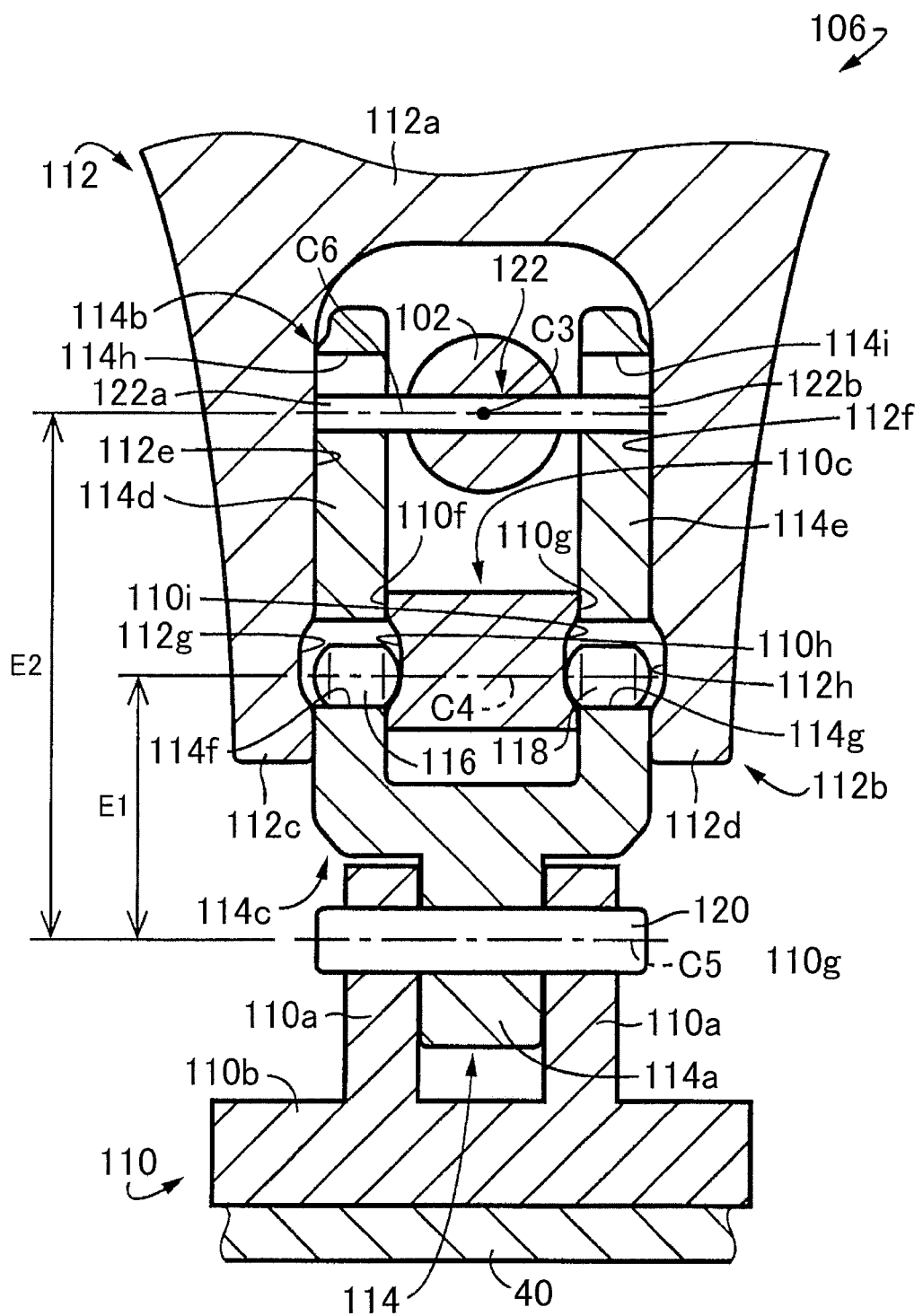
FIG. 7 is a sectional view taken along line VII-VII in FIG. 6.

As shown in FIGS. 5 to 7, the amplifying link mechanism 106 includes a fixed base 110 that is fixed to the transfer case 40 by fastening bolts 108, a shift member 112 that is integrally connected to the flange portion 92a of the nut member 92 of the screw mechanism 86, and an amplifying lever 114 that is connected to the fork shaft 102. One end portion 112a of the shift member 112 is connected, in a manner that enables relative movement parallel to the first axis C1, to the flange portion 92a of the nut member 92, and the other end portion 112b of the shift member 112 is connected to an intermediate portion (longitudinally intermediate portion) 114c in a longitudinal direction of the amplifying lever 114, in a manner that enables relative rotation around a fourth axis (first axis) C4 that is orthogonal to the first axis C1 by a first interlocking pin (interlocking pin) 116 and a second interlocking pin (interlocking pin) 118. One end portion 114a of the amplifying lever 114 is connected, in a manner that enables relative rotation around a fifth axis (second axis) C5 that is orthogonal to the first axis C1, to a shaft-shaped first shaft member 120 that is supported by a bearing portion 110a provided on the fixed base 110, and the other end portion 114b of the amplifying lever 114 is connected, in a manner that enables relative rotation around a sixth axis (third axis) C6 that is orthogonal to the first axis C1, to a shaft-shaped second shaft member 122 that is integrally fixed to the fork shaft 102.

With the amplifying link mechanism 106 structured in this way, when the threaded shaft member 94 is rotated in the direction of arrow F1 around the first axis C1 by the electric motor 84, and the nut member 92 i.e., the shift member 112, is moved in the direction of arrow F2 from the state shown in FIG. 8A, the one end portion 114a of the amplifying lever 114 rotates in the direction of arrow F3 around the fifth axis C5, and an amount of movement D1 of the shift member 112 in the direction of the first axis C1, i.e., the amount of movement D1 of the nut member 92 in the direction of the first axis C1, is amplified to an amount of movement D2 of the fork shaft 102 in the direction of the third axis C3, and the moving force of the shift member 112 in the direction of the first axis C1 is transmitted to the fork shaft 102, as shown in FIG. 8B. Also, when the shift member 112 is moved in the direction opposite the direction of arrow F2 from the state shown in FIG. 8B, the one end portion 114a of the amplifying lever 114 rotates in the direction opposite the direction of arrow F3 around the fifth axis C5, and the amount of movement D1 of the shift member 112 in the direction of the first axis C1 is amplified to the amount of movement D2 of the fork shaft 102 in the direction of the third axis C3, and the moving force of the shift member 112 in the direction of the first axis C1 is transmitted to the fork shaft 102, as shown in FIG. 8A. An amplification ratio D2/D1 of the amount of movement D1 of the shift member 112 in the direction of the first axis C1 and the amount of movement D2 of the fork shaft 102 in the direction of the third axis C3 is related to a ratio E2/E1 of a first distance E1 that is the distance from the one end portion 114a of the amplifying lever 114 to the intermediate portion 114c of the amplifying lever 114, i.e., the distance from the fifth axis C5 to the fourth axis C4, and a second distance E2 that is the distance from the one end portion 114a of the amplifying lever 114 to the other end portion 114b of the amplifying lever 114, i.e., the distance from the fifth axis C5 to the sixth axis C6, in the amplifying lever 114. The amount of movement D1 of the shift member 112 in the direction of the first axis C1 is amplified to the amount of movement D2 and transmitted to the fork shaft 102. Also, in the amplifying link mechanism 106, when the shift member 112 is moved in the direction of arrow F2, the fork shaft 102 is moved in the direction of arrow F2, and when the shift member 112 is moved in the direction opposite the direction of arrow F2, the fork shaft 102 is moved in the direction opposite the direction of arrow F2.

FIG. 8A is a view of a state of the amplifying link mechanism 106 when the nut member 92, i.e., the shift member 112, is in the H2 position, i.e., when the fork shaft 102 is in the H2 position. Also, FIG. 8B is a view of a state of the amplifying link mechanism 106 when the nut member 92, i.e., the shift member 112, is in the L4 position, i.e., when the fork shaft 102 is in the L4 position. The H2 position is a position in which the high-speed gear H is established in the high-low switching mechanism 48, and the transmission of some of the power of the rear-wheel side output shaft 44 to the drive gear 46 is interrupted in the front-wheel drive clutch 50, i.e., a position in which the outer peripheral teeth 62b of the high-low sleeve 62 are in mesh with the high-side gear teeth 64, and the outer peripheral teeth 70a of the locking sleeve 70 are not in mesh with the locking teeth 68, and the piston 82 is not abutting against the friction engagement element 80 of the front-wheel drive clutch 50. The L4 position is a position in which the low-speed gear L is established in the high-low switching mechanism 48, and the rear-wheel side output shaft 44 and the drive gear 46 are connected together in a manner unable to rotate relative to one another around the first axis C1 in the 4WD locking mechanism 58, i.e., a position in which the outer peripheral teeth 62b of the high-low sleeve 62 are in mesh with the low-side gear teeth 66, and the outer peripheral teeth 70a of the locking sleeve 70 are in mesh with the locking teeth 68.

Also, the transmitting mechanism 88 includes a third transmitting mechanism 88c that transmits the linear motion of the nut member 92 of the screw mechanism 86 to the 4WD locking mechanism 58. The third transmitting mechanism 88c includes the fork shaft 102, the fork 104, and the amplifying link mechanism 106, similar to the second transmitting mechanism 88b, and also includes the high-low sleeve 62 that is connected to the fork 104, the first spring 72 that is arranged in a compressed state between the high-low sleeve 62 and the locking sleeve 70, and the second spring 74 that is arranged in a compressed state between the locking sleeve 70 and the protruding portion 44a of the rear-wheel side output shaft 44.

Therefore, in the third transmitting mechanism 88c, as described above, when the movement of the nut member 92 in the direction of the first axis C1 is amplified by the amplifying link mechanism 106 and transmitted to the fork shaft 102, and the outer peripheral teeth 62b of the high-low sleeve 62 are moved to a position where they mesh with the low-side gear teeth 66 as the fork shaft 102 is moved in the direction of arrow F2, the locking sleeve 70 receives thrust in the locking direction toward the drive gear 46 side via the first spring 72. As a result, the outer peripheral teeth 70a of the locking sleeve 70 are moved toward the drive gear 46 side against the urging force of the second spring 74 that is set weaker than the first spring 72, and come into mesh with the locking teeth 68 of the drive gear 46. Also, when the fork shaft 102 is moved in the direction opposite the direction of the arrow F2 and the outer peripheral teeth 62b of the high-low sleeve 62 are moved to a position where they mesh with the high-side gear teeth 64, from the state in which the outer peripheral teeth 62b of the high-low sleeve 62 are in mesh with the low-side gear teeth 66, the locking sleeve 70 receives thrust in the 4WD unlocking direction toward the side away from the drive gear 46 from the second spring 74. As a result, the locking sleeve 70 is moved toward the side away from the drive gear 46 by the urging force of the second spring 74, such that the outer peripheral teeth 70a of the locking sleeve 70 separate from the locking teeth 68 of the drive gear 46. That is, in the third transmitting mechanism 88c, when the high-low sleeve 62 of the high-low switching mechanism 48 is driven via the fork 104 by the fork shaft 102 moving in the direction of the third axis C3, the locking sleeve 70 of the 4WD locking mechanism 58 receives the thrust in the locking direction, or the thrust in the 4WD unlocking direction, via the first spring 72 and the second spring 74.

In the amplifying link mechanism 106, the other end portion 112b of the shift member 112 is formed by a pair of first protruding portions 112c and 112d that protrude dividing into two from the one end portion 112a of the shift member 112, as shown in FIGS. 5 and 7. Also, the intermediate portion 114c and the other end portion 114b of the amplifying lever 114 are formed by a pair of second protruding portions 114d and 114e that protrude dividing into two from the one end portion 114a of the amplifying lever 114. Also, the fixed base 110 includes a flat plate-shaped fixed portion 110b that is integrally fixed to the transfer case 40 by the fastening bolts 108, an elongated longitudinal portion 110c that is arranged between the pair of second protruding portions 114d and 114e of the intermediate portion 114c of the amplifying lever 114 and extends parallel to the direction of the first axis C1, i.e., the third axis C3, and a pair of connecting portions 110d and 110e that each connect one end portion (i.e., a corresponding end portion) of the longitudinal portion 110c to the fixed portion 110b. In the amplifying link mechanism 106, the pair of second protruding portions 114d and 114e of the amplifying lever 114 are arranged between the pair of first protruding portions 112c and 112d of the shift member 112, with the first protruding portions 112c and 112d of the shift member 112 and the second protruding portions 114d and 114e of the amplifying lever 114 able to slidingly contact each other at a right angle to the third axis C3 of the fork shaft 102, i.e., the first axis C1, as shown in FIG. 7. Also, the longitudinal portion 110c of the fixed base 110 is arranged between the pair of second protruding portions 114d and 114e of the amplifying lever 114, with the second protruding portions 114*d* and 114*e* of the amplifying lever 114 and the longitudinal portion 110*c* of the fixed base 110 able to slidingly contact each other at a right angle to the third axis C3 of the fork shaft 102. That is, in the amplifying link mechanism 106, the longitudinal portion 110*c* of the fixed base 110, the second protruding portions 114*d* and 114*e* of the amplifying lever 114, and the first protruding portions 112*c* and 112*d* of the shift member 112 are able to slidingly contact each other at a right angle to the third axis C3 of the fork shaft 102.

The amplifying link mechanism 106 includes the first interlocking pin 116 and the second interlocking pin 118 that each have a roller-shape, e.g., a cylindrical shape, the first through-holes 114*f* and 114*g* through the pair of second protruding portions 114*d* and 114*e*, respectively, of the intermediate portion 114*c* of the amplifying lever 114, second through-holes 114*h* and 114*i* through the pair of second protruding portions 114*d* and 114*e*, respectively, of the other end portion 114*b* of the amplifying lever 114, first recessed portions (engaging recessed portions) 112*g* and 112*h* that are formed recessed on sliding surfaces 112*e* and 112*f* that slidingly contact the second protruding portions 114*d* and 114*e* of the amplifying lever 114, of the first protruding portions 112*c* and 112*d* of the shift member 112, second recessed portions (engaging recessed portions) 110*h* and 110*i* that are formed recessed on sliding surfaces 110*f* and 110*g* that slidingly contact the second protruding portions 114*d* and 114*e* of the amplifying lever 114, of the longitudinal portion 110*c* of the fixed base 110, and a pair of stoppers 100*j* that are fixed to the high-low switching mechanism 48 side, with respect to the amplifying lever 114, of the longitudinal portion 110*c* of the fixed base 110, as shown in FIGS. 5 to 8B.

The first interlocking pin 116 is such that a portion of the first interlocking pin 116 is housed so as to be able to move in the axial direction of the first interlocking pin 116, i.e., in the direction of the fourth axis C4, in the first through-hole 114*f* formed in the second protruding portion 114*d* of the amplifying lever 114. Also, the second interlocking pin 118 is such that a portion of the second interlocking pin 118 is housed so as to be able to move in the axial direction of the second interlocking pin 118, i.e., in the direction of the fourth axis C4, in the first through-hole 114*g* formed in the second protruding portion 114*e* of the amplifying lever 114. The first through-holes 114*f* and 114*g* formed in the second protruding portions 114*d* and 114*e* of the amplifying lever 114 are formed in long hole shapes such that the first interlocking pin 116 and the second interlocking pin 118 are able to move in the longitudinal direction of the second protruding portions 114*d* and 114*e* inside the first through-holes 114*f* and 114*g*. Also, end portions 122*a* and 122*b* of the second shaft member 122 provided on the fork shaft 102 are relatively rotatably fit into the second through-holes 114*h* and 114*i*, respectively, formed in the second protruding portions 114*d* and 114*e* of the amplifying lever 114. These through-holes 114*h* and 114*i* are formed in long hole shapes such that the end portions 122*a* and 122*b* of the second shaft member 122 are able to move in the longitudinal direction of the second protruding portions 114*d* and 114*e*, inside the second through-holes 114*h* and 114*i*.

As shown in FIGS. 9A to 10C, the first interlocking pin 116 is such that one end portion 116*a* on the first protruding portion 112*c* side of the shift member 112 and the other end portion 116*b* on the longitudinal portion 110*c* side of the fixed base 110 are each formed in a spherical shape, and a circular cylindrical-shaped shaft portion 116*c* is integrally connected between the one end portion 116*a* and the other end portion 116*b*. Also, the second interlocking pin 118 is such that one end portion 118*a* on the first protruding portion 112*d* side of the shift member 112 and the other end portion 118*b* on the longitudinal portion 110*c* side of the fixed base 110 are each formed in a spherical shape, and a circular cylindrical-shaped shaft portion 118*c* is integrally connected between the one end portion 118*a* and the other end portion 118*b*.

Figure 9A:
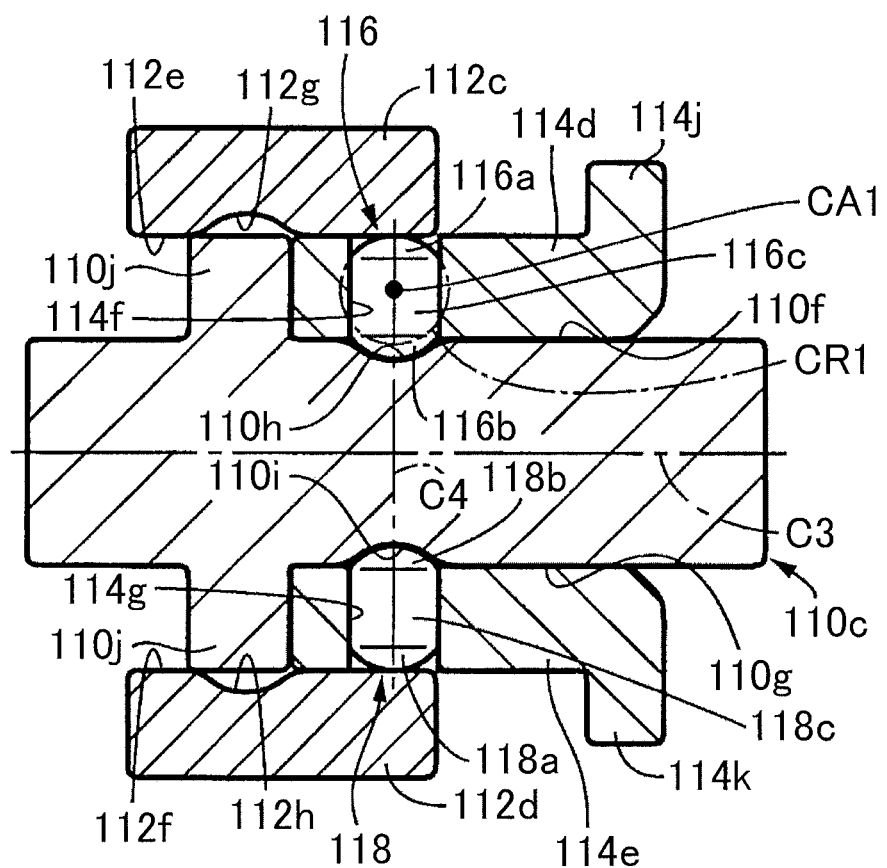
FIG. 9A is a sectional view taken along line A-A in FIG. 6 illustrating functions of a first interlocking pin and a second interlocking pin, and a stopper provided on a fixed base, and the like, and when the shift member moves from an L4 position to an H4 position, and is a view showing a state in which the shift member is in the H4 position.
Figure 9B:
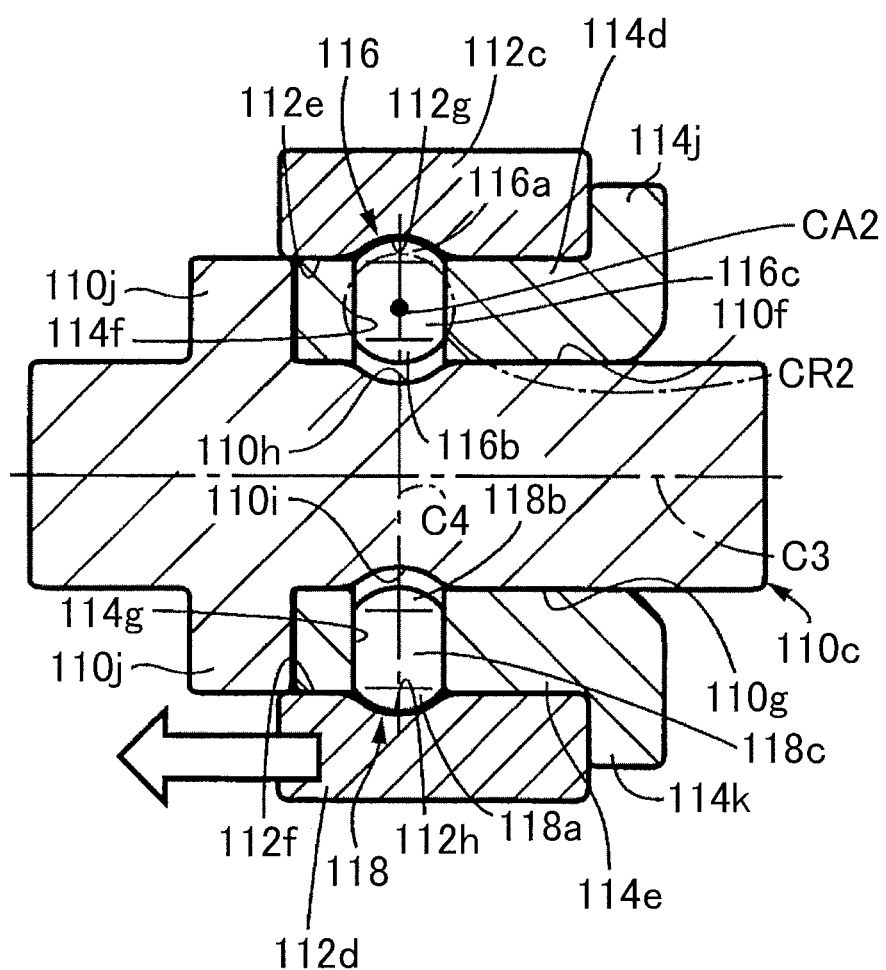
FIG. 9B is a sectional view taken along line A-A in FIG. 6 illustrating the functions of the first interlocking pin and the second interlocking pin, and the stopper provided on the fixed base, and the like, and when the shift member moves from the L4 position to the H4 position, and is a view showing a state in which the shift member is in the H2 position.
Figure 9C:
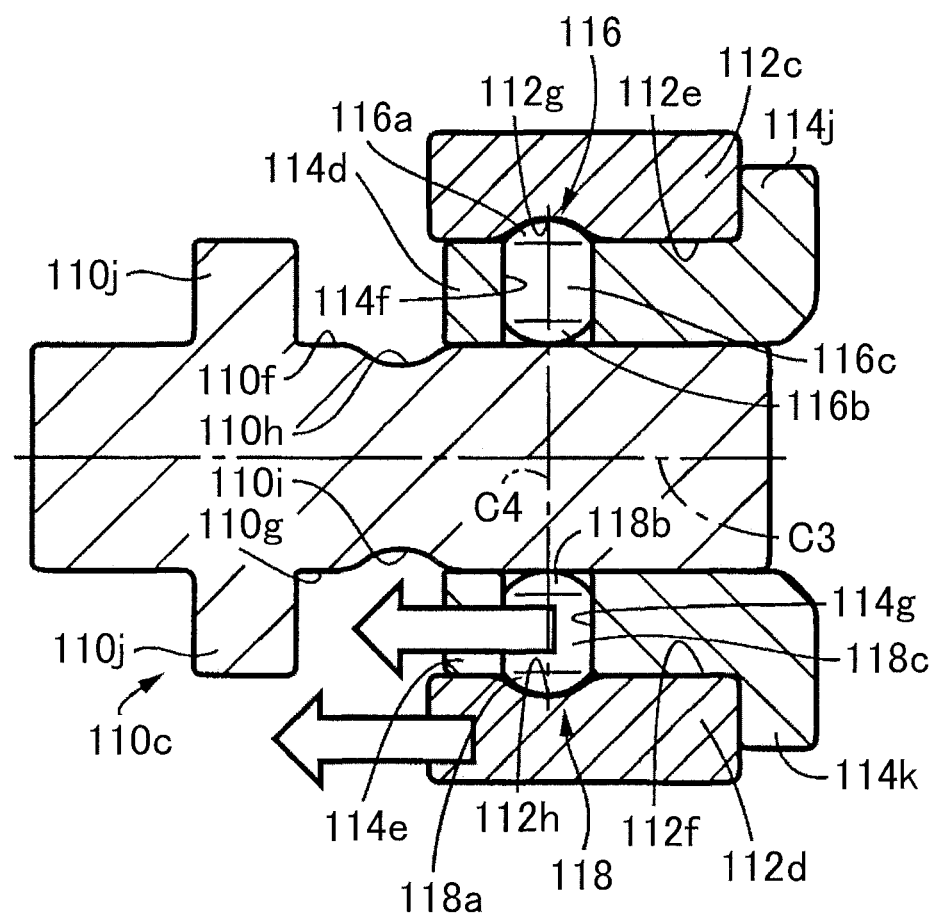
FIG. 9C is a sectional view taken along line A-A in FIG. 6 illustrating the functions of the first interlocking pin and the second interlocking pin, and the stopper provided on the fixed base, and the like, and when the shift member moves from the L4 position to the H4 position, and is a view showing a state in which the shift member is in the L4 position.
Figure 10A:
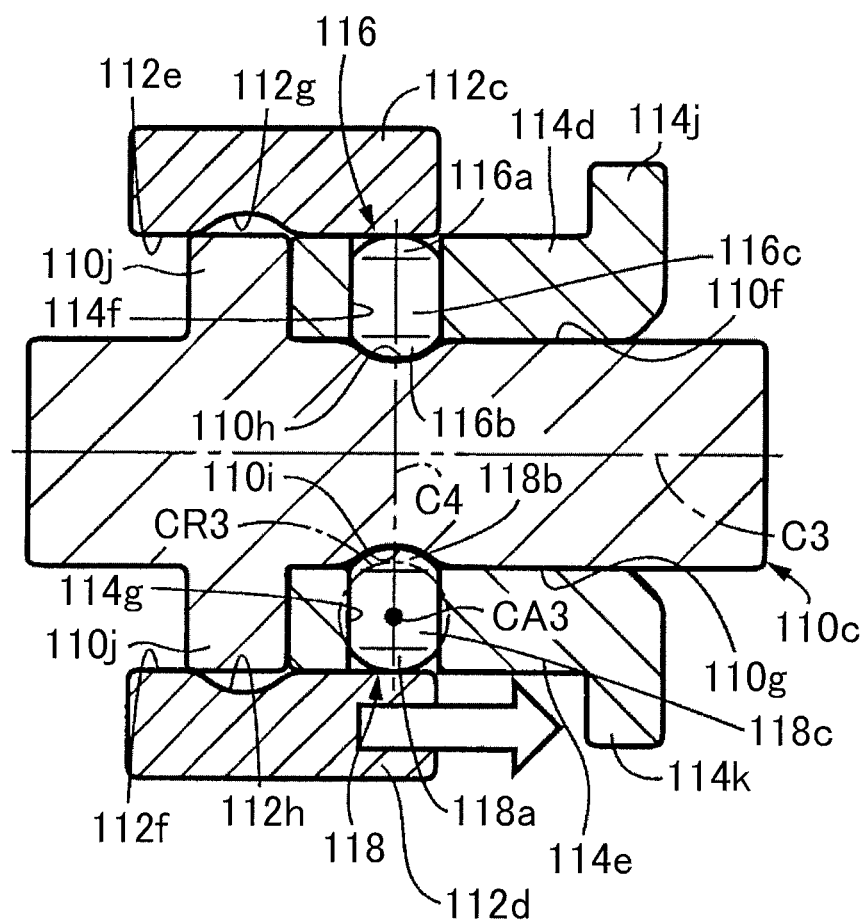
FIG. 10A is a sectional view taken along line A-A in FIG. 6 illustrating the functions of the first interlocking pin and the second interlocking pin, and the stopper provided on the fixed base, and the like, and when the shift member moves from the H4 position to the L4 position, and is a view showing the state in which the shift member is in the H4 position.
Figure 10B:
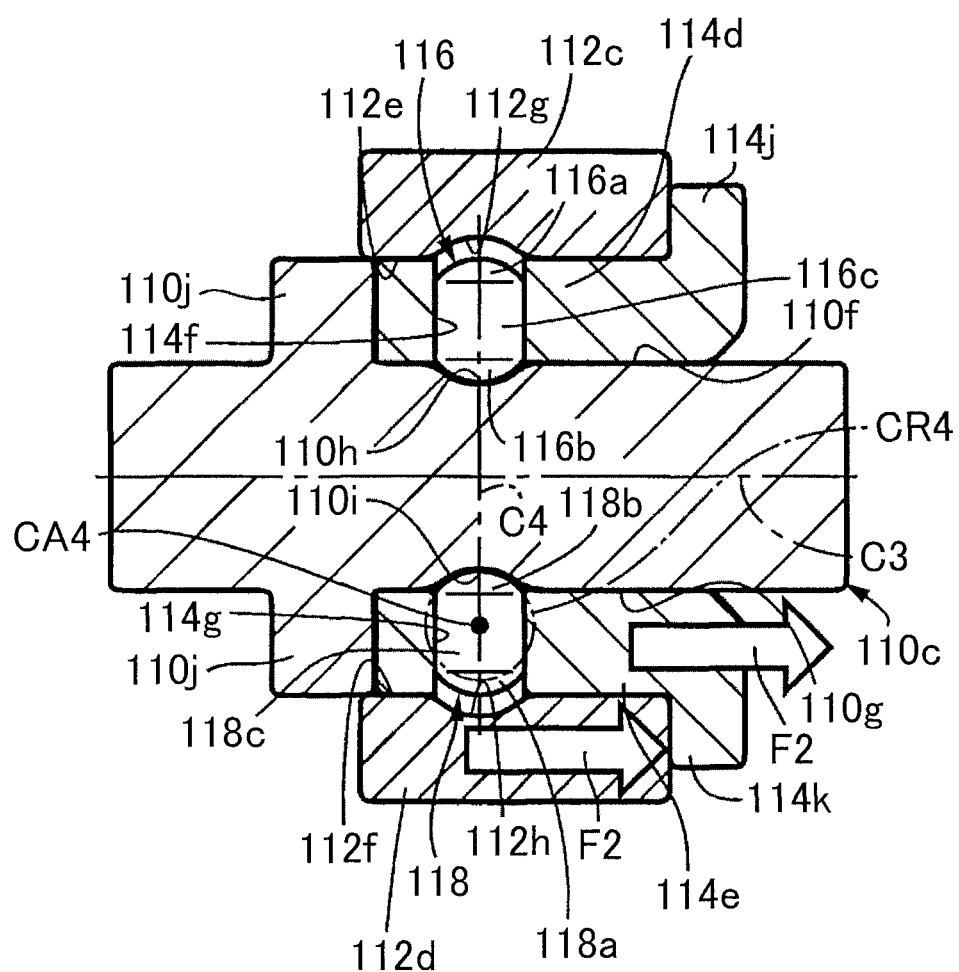
FIG. 10B is a sectional view taken along line A-A in FIG. 6 illustrating the functions of the first interlocking pin and the second interlocking pin, and the stopper provided on the fixed base, and the like, and when the shift member moves from the H4 position to the L4 position, and is a view showing a state in which the shift member is in the H2 position.
Figure 10C:
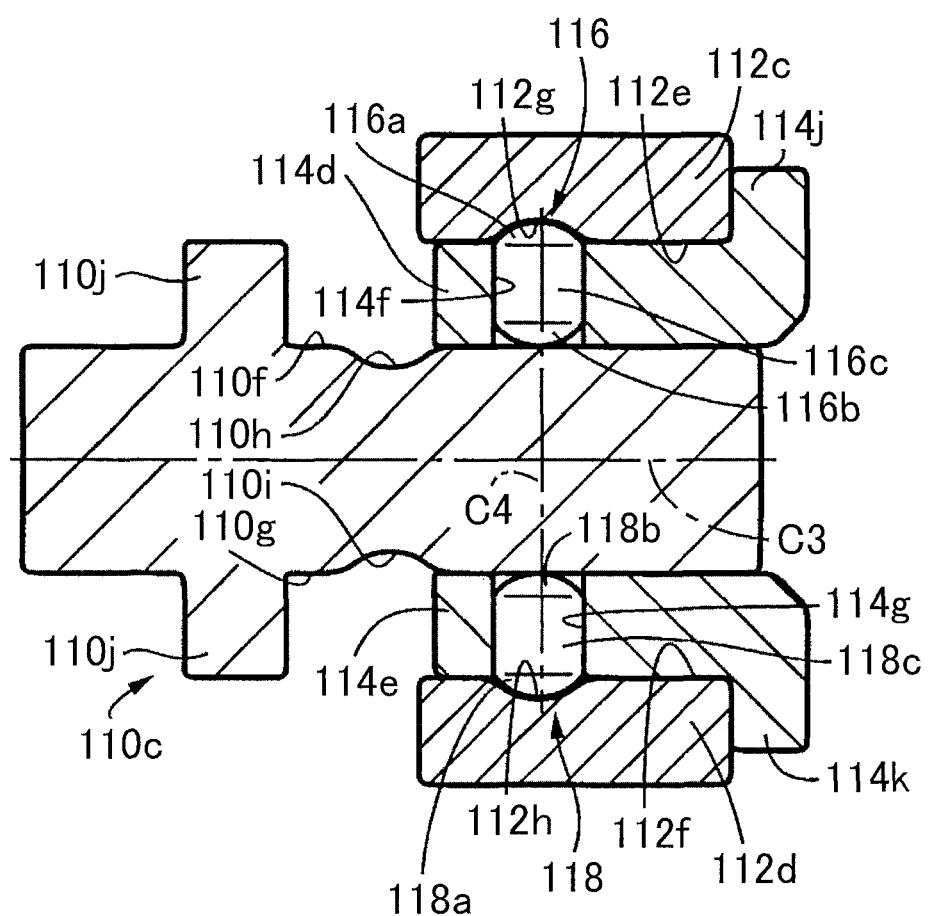
FIG. 10C is a sectional view taken along line A-A in FIG. 6 illustrating the functions of the first interlocking pin and the second interlocking pin, and the stopper provided on the fixed base, and the like, and when the shift member moves from the H4 position to the L4 position, and is a view showing a state in which the shift member is in the L4 position.

Also, FIGS. 9A to 10C are views illustrating the functions of the first interlocking pin 116 and the second interlocking pin 118, and stoppers 110*j* provided on the fixed base 110, and the like. FIGS. 9A and 10A are views showing a state in which the shift member 112 is in an H4 position, FIGS. 9B and 10B are views showing a state in which the shift member 112 is in an H2 position, and FIGS. 9C and 10C are views showing a state in which the shift member 112 is in an L4 position. The shift member 112 is moved to the L4 position, the H2 position, and the H4 position, by the movement of the nut member 92 of the screw mechanism 86 in the direction of the first axis C1. Also, FIGS. 9A to 9C are views showing a state in which the shift member 112 moves from the rear-wheel side output shaft 44 side to the input shaft 42 side, i.e., when the shift member 112 moves from the L4 position to the H4 position, and FIGS. 10A to 10C are views showing a state in which the shift member 112 moves from the input shaft 42 side to the rear-wheel side output shaft 44 side, i.e., when the shift member 112 moves from the H4 position to the L4 position. The H4 position is a position in which the high-speed gear H is established in the high-low switching mechanism 48 and some of the power of the rear-wheel side output shaft 44 is transmitted to the drive gear 46 in the front-wheel drive clutch 50, i.e., a position in which the outer peripheral teeth 62*b* of the high-low sleeve 62 are in mesh with the high-side gear teeth 64, the outer peripheral teeth 70*a* of the locking sleeve 70 are not in mesh with the locking teeth 68, and the piston 82 is abutting against the friction engagement element 80 of the front-wheel drive clutch 50.

As shown in FIG. 9A, the end portion 116*a* of the first interlocking pin 116 is formed such that a center of curvature CA1 of a spherical surface of the one end portion 116*a* is positioned between the one end portion 116*a* and the other end portion 116*b* of the first interlocking pin 116, i.e., on the axis of the circular cylindrical-shaped shaft portion 116*c*. A portion of an alternate long and short dash line circle CR1 in FIG. 9A indicates a circle of curvature of the spherical surface of the one end portion 116*a* of the first interlocking pin 116. Also, a depth of the first recessed portion 112*g* of the first protruding portion 112*c* of the shift member 112 in the direction of the fourth axis C4 is set such that, if the shift member 112 tries to move in the direction of the first axis C1, i.e., the direction of the third axis C3, for example, while the one end portion 116*a* of the first interlocking pin 116 is engaged with the first recessed portion 112*g* of the first protruding portion 112*c* of the shift member 112 as shown in FIGS. 9C and 10C, an inclined surface of an open edge portion of the first recessed portion 112*g* of the shift member 112 will abut against the inclined surface of the spherical surface of the one end portion 116*a*.

As shown in FIG. 9B, the other end portion 116*b* of the first interlocking pin 116 is formed such that a center of curvature CA2 of a spherical surface of the other end portion 116*b* is positioned between the one end portion 116*a* and the other end portion 116*b* of the first interlocking pin 116, i.e., on the axis of the circular cylindrical-shaped shaft portion 116*c*. A portion of an alternate long and short dash line circle CR2 in FIG. 9B indicates a circle of curvature of the spherical surface of the other end portion 116*b* of the first interlocking pin 116. Also, a depth of the second recessed portion 110h of the longitudinal portion 110c of the fixed base 110 in the direction of the fourth axis C4 is set such that, if the amplifying lever 114 tries to move in the direction of the third axis C3, for example, while the other end portion 116b of the first interlocking pin 116 is engaged with the second recessed portion 110h of the longitudinal portion 110c of the fixed base 110 as shown in FIGS. 9A and 10A, an inclined surface of an open edge portion of the second recessed portion 110h will abut against the inclined surface of the spherical surface of the other end portion 116b.

As shown in FIG. 10A, the one end portion 118a of the second interlocking pin 118 is formed such that a center of curvature CA3 of a spherical surface of the one end portion 118a is positioned between the one end portion 118a and the other end portion 118b of the second interlocking pin 118, i.e., on the axis of the circular cylindrical-shaped shaft portion 118c. A portion of an alternate long and short dash line circle CR3 in FIG. 10A indicates a circle of curvature of the spherical surface of the one end portion 118a of the second interlocking pin 118. Also, a depth of the first recessed portion 112h of the first protruding portion 112d of the shift member 112 in the direction of the fourth axis C4 is set such that, if the shift member 112 tries to move in the direction of the first axis C1, i.e., the direction of the third axis C3, for example, while the one end portion 118a of the second interlocking pin 118 is engaged with the first recessed portion 112h of the first protruding portion 112d of the shift member 112 as shown in FIGS. 9C and 10C, an inclined surface of an open edge portion of the first recessed portion 112h of the shift member 112 will abut against the inclined surface of the spherical surface of the one end portion 118a.

As shown in FIG. 10B, the other end portion 118b of the second interlocking pin 118 is formed such that a center of curvature CA4 of a spherical surface of the other end portion 118b is positioned between the one end portion 118a and the other end portion 118b of the second interlocking pin 118, i.e., on the axis of the circular cylindrical-shaped shaft portion 118c. A portion of an alternate long and short dash line circle CR4 in FIG. 10B indicates a circle of curvature of the spherical surface of the other end portion 118b of the second interlocking pin 118. Also, a depth of the second recessed portion 110i of the longitudinal portion 110c of the fixed base 110 in the direction of the fourth axis C4 is set such that, if the amplifying lever 114 tries to move in the direction of the third axis C3, for example, while the other end portion 118b of the second interlocking pin 118 is engaged with the second recessed portion 110i of the longitudinal portion 110c of the fixed base 110 as shown in FIGS. 9A and 10A, an inclined surface of an open edge portion of the second recessed portion 110i will abut against the inclined surface of the spherical surface of the other end portion 118b.

With the first interlocking pin 116, the dimension of the first interlocking pin 116 in the direction of the fourth axis C4 is set such that the one end portion 116a of the first interlocking pin 116 and the first recessed portion 112g of the first protruding portion 112c of the shift member 112, and the other end portion 116b of the first interlocking pin 116 and the second recessed portion 110h of the longitudinal portion 110c of the fixed base 110, alternatively engage, as shown in FIGS. 9B and 9C and FIGS. 10B and 10A. Also, with the second interlocking pin 118, the dimension of the second interlocking pin 118 in the direction of the fourth axis C4 is set such that the one end portion 118a of the second interlocking pin 118 and the first recessed portion 112h of the first protruding portion 112d of the shift member 112, and the other end portion 118b of the second interlocking pin 118 and the second recessed portion 110i of the longitudinal portion 110c of the fixed base 110, alternatively engage, as shown in FIGS. 9B and 9C and FIGS. 10B and 10A.

The positions of the stoppers 110j formed on the longitudinal portion 110c of the fixed base 110 are arranged such that the stoppers 110j abut against the second protruding portions 114d and 114e of the amplifying lever 114 when the shift member 112 moves from the L4 position to the H2 position, as shown in FIGS. 9C and 9B. Also, the position of the first recessed portion 112g formed on the first protruding portion 112c of the shift member 112 is designed such that the first recessed portion 112g is arranged on the fourth axis C4 of the first through-hole 114f formed in the second protruding portion 114d of the amplifying lever 114 when the shift member 112 moves from the H4 position to the H2 position, as shown in FIGS. 10A and 10B. Also, the position of the first recessed portion 112h formed on the first protruding portion 112d of the shift member 112 is designed such that the first recessed portion 112h is arranged on the fourth axis C4 of the first through-hole 114g formed in the second protruding portion 114e of the amplifying lever 114 when the shift member 112 moves from the H4 position to the H2 position, as shown in FIGS. 10A and 10B.

As shown in FIGS. 9A to 10C, protruding portions 114j and 114k that each protrude in a direction away from the longitudinal portion 110c of the fixed base 110 from end portions that are on the side opposite the side with the stoppers 110j (i.e., the stopper 100j side) of the fixed base 110 in the direction of the first axis C1, of the second protruding portions 114d and 114e, are formed on the pair of second protruding portions 114d and 114e of the amplifying lever 114. The positions of the protruding portions 114j and 114k formed on the second protruding portions 114d and 114e of the amplifying lever 114 are arranged such that the protruding portions 114j and 114k abut against the first protruding portions 112c and 112d of the shift member 112 when the shift member 112 moves from the H4 position to the H2 position, as shown in FIGS. 10A and 10B.

With the amplifying link mechanism 106 formed in this way, even if the shift member 112 is moved from the H4 position to the H2 position as shown in FIGS. 10A and 10B, the first protruding portions 112c and 112d of the shift member 112 will pass over the through-holes 114f and 114g formed in the second protruding portion 114d and 114e of the amplifying lever 114, so the amplifying lever 114, i.e., the fork shaft 102, will not move. That is, the outer peripheral teeth 62b of the high-low sleeve 62 that is connected to the fork shaft 102 via the fork 104 remain in mesh with the high-side gear teeth 64. Also, with the amplifying link mechanism 106, when the shift member 112 is moved from the H2 position to the L4 position as shown in FIGS. 10B and 10C, the amplifying lever 114, i.e., the fork shaft 102, moves in the direction of arrow F2, by the first protruding portions 112c and 112d of the shift member 112 abutting against the protruding portions 114j and 114k provided on the second protruding portions 114d and 114e of the amplifying lever 114. As a result, the outer peripheral teeth 62b of the high-low sleeve 62 that is connected to the fork 104 mesh with the low-side gear teeth 66.

When the first protruding portions 112c and 112d of the shift member 112 abut against the protruding portions 114j and 114k of the second protruding portions 114d and 114e of the amplifying lever 114, respectively, and the shift member 112 passes the H2 position, the inclined surface of the open edge portion of the second recessed portion 110h formed on the longitudinal portion 110c of the fixed base 110 abuts against the inclined surface of the spherical surface of the other end portion 116b of the first interlocking pin 116, and the one end portion 116a of the first interlocking pin 116 engages with the first recessed portion 112g formed on the first protruding portion 112c of the shift member 112. When the inclined surface of the open edge portion of the second recessed portion 110h abuts against the inclined surface of the spherical surface of the other end portion 116b of the first interlocking pin 116, thrust in a direction toward the first protruding portion 112c of the shift member 112 is generated in the other end portion 116b of the first interlocking pin 116. Also, when the first protruding portions 112c and 112d of the shift member 112 abut against the protruding portions 114j and 114k of the second protruding portions 114d and 114e of the amplifying lever 114, respectively, and the shift member 112 passes the H2 position, the inclined surface of the open edge portion of the second recessed portion 110i formed on the longitudinal portion 110c of the fixed base 110 abuts against the inclined surface of the spherical surface of the other end portion 118b of the second interlocking pin 118, and the one end portion 118a of the second interlocking pin 118 engages with the first recessed portion 112h formed on the first protruding portion 112d of the shift member 112. When the inclined surface of the open edge portion of the second recessed portion 110i abuts against the inclined surface of the spherical surface of the other end portion 118b of the second interlocking pin 118, thrust in a direction toward the first protruding portion 112d of the shift member 112 is generated in the other end portion 118b of the second interlocking pin 118.

With the amplifying link mechanism 106, when the shift member 112 is moved from the L4 position to the H2 position as shown in FIGS. 9C and 9B, the amplifying lever 114, i.e., the fork shaft 102, moves in the direction opposite the direction of arrow F2 by the first interlocking pin 116 and the second interlocking pin 118, and the outer peripheral teeth 62b of the high-low sleeve 62 that is connected to the fork 104 mesh with the high-side gear teeth 64.

When the shift member 112 moves from the L4 position to the H2 position and then passes the H2 position, the inclined surface of the open edge portion of the first recessed portion 112g formed on the first protruding portion 112c of the shift member 112 abuts against the inclined surface of the spherical surface of the one end portion 116a of the first interlocking pin 116, and thrust in a direction toward the longitudinal portion 110c of the fixed base 110 is generated in the one end portion 116a of the first interlocking pin 116, such that the other end portion 116b of the first interlocking pin 116 engages with the second recessed portion 110h formed on the longitudinal portion 110c of the fixed base 110. Also, although thrust in a direction toward the longitudinal portion 110c of the fixed base 110 is generated in the one end portion 116a of the first interlocking pin 116 when the shift member 112 is moved from the L4 position to the H2 position, the other end portion 116b of the first interlocking pin 116 abuts against the sliding surface 110f of the longitudinal portion 110c of the fixed base 110, so the one end portion 116a of the first interlocking pin 116 remains engaged with the first recessed portion 112g formed on the first protruding portion 112c of the shift member 112. Also, when the shift member 112 moves from the L4 position to the H2 position and then passes the H2 position, the inclined surface of the open edge portion of the first recessed portion 112h formed on the first protruding portion 112d of the amplifying lever 114 abuts against the inclined surface of the spherical surface of the one end portion 118a of the second interlocking pin 118, and thrust in a direction toward the longitudinal portion 110c of the fixed base 110 is generated in the one end portion 118a of the second interlocking pin 118, such that the other end portion 118b of the second interlocking pin 118 engages with the second recessed portion 110i formed on the longitudinal portion 110c of the fixed base 110. Also, although thrust in a direction toward the longitudinal portion 110c of the fixed base 110 is generated in the one end portion 118a of the second interlocking pin 118 when the shift member 112 is moved from the L4 position to the H2 position, the other end portion 118b of the second interlocking pin 118 abuts against the sliding surface 110g of the longitudinal portion 110c of the fixed base 110, so the one end portion 118a of the second interlocking pin 118 remains engaged with the first recessed portion 112h formed on the first protruding portion 112d of the shift member 112.

With the amplifying link mechanism 106, even if the shift member 112 is moved from the H2 position to the H4 position, as shown in FIGS. 9B and 9A, the first protruding portions 112c and 112d of the shift member 112 will pass over the first through-holes 114f and 114g formed in the second protruding portions 114d and 114e of the amplifying lever 114, so the amplifying lever 114, i.e., the fork shaft 102, will not move. That is, the outer peripheral teeth 62b of the high-low sleeve 62 that is connected to the fork 104 remain in mesh with the high-side gear teeth 64. Also, when the shift member 112 is moved from the H2 position to the H4 position as shown in FIGS. 9B and 9A, the amplifying lever 114 is stopped by the second protruding portions 114d and 114e abutting against the stoppers 110j formed on the longitudinal portion 110c of the fixed base 110.

As described above, in the amplifying link mechanism 106, when the shift member 112 moves from the H4 position to the H2 position as shown in FIGS. 10A and 10B, the first interlocking pin 116 engages with the second protruding portion 114d of the amplifying lever 114 and the longitudinal portion 110c of the fixed base 110, and the second interlocking pin 118 engages with the second protruding portion 114e of the amplifying lever 114 and the longitudinal portion 110c of the fixed base 110. Therefore, the shift member 112 and the amplifying lever 114 are disengaged, i.e., the power transmitting path between the shift member 112 and the amplifying lever 114 is interrupted, so even if the shift member 112 moves, the fork shaft 102 will not move in the direction of the third axis C3. Further, when the shift member 112 moves from the H2 position to the L4 position as shown in FIGS. 10B and 10C, the first interlocking pin 116 engages with the first protruding portion 112c of the shift member 112 and the second protruding portion 114d of the amplifying lever 114, and the second interlocking pin 118 engages with the first protruding portion 112d of the shift member 112 and the second protruding portion 114e of the amplifying lever 114. Therefore, when the shift member 112 moves, the amount of movement D1 of the shift member 112 is amplified to the amount of movement D2 via the amplifying lever 114, and the fork shaft 102 moves in the direction of the third axis C3. That is, as shown in FIGS. 10A to 10C, the second recessed portions 110h and 110i formed on the longitudinal portion 110c of the fixed base 110 receive the other end portion 116b of the first interlocking pin 116 and the other end portion 118b of the second interlocking pin 118, respectively, when the shift member 112 is in the H4 position or the H2 position, or between the H4 position and the H2 position, and the first recessed portions 112g and 112h formed on the first protruding portions 112c and 112d of the shift member 112 receive the one end portion 116a of the first interlocking pin 116 and the one end portion 118a of the second interlocking pin 118, respectively, when the shift member 112 passes the H2 position. Therefore, with the amplifying link mechanism 106, when the shift member 112 moves from the H4 position to the H2 position when the shift member 112 moves in the direction from the H4 position to the L4 position, the one end portion 116a of the first interlocking pin 116 and the one end portion 118a of the second interlocking pin 118 do not engage with the first recessed portions 112g and 112h formed on the first protruding portions 112c and 112d of the shift member 112, so the amplifying lever 114 is unable to be urged in the direction of the third axis C3 by the shift member 112 via the first interlocking pin 116 and the second interlocking pin 118. When the shift member 112 moves past the H2 position to the L4 position, the amplifying lever 114 is urged in the direction of the third axis C3 by the shift member 112 via the first interlocking pin 116 and the second interlocking pin 118.

Further, in the amplifying link mechanism 106, when the shift member 112 moves from the L4 position to the H2 position as shown in FIGS. 9C and 9B, the first interlocking pin 116 engages with the first protruding portion 112c of the shift member 112 and the second protruding portion 114d of the amplifying lever 114, and the second interlocking pin 118 engages with the first protruding portion 112d of the shift member 112 and the second protruding portion 114e of the amplifying lever 114. Therefore, when the shift member 112 moves, the amount of movement D1 of the shift member 112 is amplified via the amplifying lever 114, and the fork shaft 102 moves in the direction of the third axis C3. Also, when the shift member 112 moves from the H2 position to the H4 position as shown in FIGS. 9B and 9A, the first interlocking pin 116 engages with the second protruding portion 114d of the amplifying lever 114 and the longitudinal portion 110c of the fixed base 110, and the second interlocking pin 118 engages with the second protruding portion 114e of the amplifying lever 114 and the longitudinal portion 110c of the fixed base 110, by the amplifying lever 114 abutting against the stoppers 110j formed on the fixed base 110. Therefore, the shift member 112 and the amplifying lever 114 are disengaged, i.e., the power transmitting path between the shift member 112 and the amplifying lever 114 is interrupted, so even if the shift member 112 moves, the fork shaft 102 will not move in the direction of the third axis C3. That is, as shown in FIGS. 9A to 9C, the first recessed portions 112g and 112h formed on the first protruding portions 112c and 112d of the shift member 112 receive the one end portion 116a of the first interlocking pin 116 and the one end portion 118a of the second interlocking pin 118, respectively, when the shift member 112 is in a position from the L4 position to the H2 position, and the second recessed portions 110h and 110i formed on the longitudinal portion 110c of the fixed base 110 receive the other end portion 116b of the first interlocking pin 116 and the other end portion 118b of the second interlocking pin 118, respectively, when the shift member 112 passes the H2 position. Therefore, with the amplifying link mechanism 106, when the shift member 112 moves from the L4 position to the H2 position when the shift member 112 moves in the direction from the L4 position to the H4 position, the amplifying lever 114 is urged in the direction of the third axis C3 by the shift member 112 via the first interlocking pin 116 and the second interlocking pin 118. When the shift member 112 moves past the H2 position to the H4 position, the movement of the amplifying lever 114 is stopped by the stoppers 110j formed on the fixed base 110, and the one end portion 116a of the first interlocking pin 116 and the one end portion 118a of the second interlocking pin 118 do not engage with the first recessed portions 112g and 112h formed on the first protruding portions 112c and 112d of the shift member 112, so the amplifying lever 114 is unable to be urged in the direction of the third axis C3 by the shift member 112.

Returning now to FIG. 1, the vehicle 10 is provided with an electronic control unit (ECU) 200 that includes a control apparatus of the vehicle 10 that switches between 2WD and 4WD, for example. The ECU 200 includes a so-called microcomputer that includes, for example, a CPU, RAM, ROM, and an input/output interface and the like. The CPU executes various controls of the vehicle 10 by processing signals according to a program stored in advance in the ROM, while using the temporary storage function of the RAM. For example, the ECU 200 is configured to execute output control of the engine 12, and switching control to switch the driving state of the vehicle 10, and the like, and is formed divided into sections for engine control and driving state control and the like as necessary. As shown in FIG. 1, various actual values based on detection signals from various sensors provided in the vehicle 10 are supplied to the ECU 200. Examples of such various actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a 4WD lock selector switch 214 has been operated, and the like. Examples of the various sensors include an engine speed sensor 202, a motor rotation angle sensor 204, wheel speed sensors 206, an accelerator operation amount sensor 208, the H-range selector switch 210 for selecting the high-speed gear H in response to an operation by the driver, the 4WD selector switch 212 for selecting 4WD in response to an operation by the driver, and the 4WD lock selector switch 214 for selecting the 4WD locked state in response to an operation by the driver, and the like. Various signals, for example, an engine output control command signal Se for output control of the engine 12, an operation command signal Sd for switching the state of the front-side clutch 36, and a motor drive command signal Sm for controlling the rotation amount of the electric motor 84, and the like, are output from the ECU 200 to an output control apparatus of the engine 12, an actuator of the front-side clutch 36, the electric motor 84, and the transfer 22 and the like, respectively, as shown in FIG. 1.

With the vehicle 10 structured as described above, the amount of movement (i.e., the stroke) of the nut member 92 is controlled such that the shift member 112 is moved to the L4 position, the H2 position, or the H4 position, by controlling the rotation amount of the electric motor 84. When the fork shaft 102 is moved to the H2 position, the vehicle 10 is placed in a 2WD running state in which only the rear wheels 16 are driven in the high-speed gear H. Also, when the front-side clutch 36 is placed in the released state when the shift member 112 has been moved to the H2 position, rotation is not transmitted from either the engine 12 side or the front wheel 14 side, to the rotating elements (e.g., the drive gear 46, the front-wheel drive chain 56, the driven gear 54, the front-wheel side output shaft 52, the front propeller shaft 24, and the front wheel differential gear unit 28) that form the power transmitting path from the drive gear 46 to the front wheel differential gear unit 28, when running in 2WD. Therefore, when running in 2WD, these rotating elements are stopped from rotating and thus are prevented from being dragged along, so running resistance is reduced. Also, when the shift member 112 has been moved to the H4 position, the transfer torque of the front-wheel drive clutch 50 is controlled and the torque distribution between the front wheels 14 and the rear wheels 16 is adjusted as necessary, by controlling the rotation amount of the electric motor 84 to move the nut member 92 toward the pressing side from a position where the piston 82 is abutted against the friction engagement element 80. Further, when the shift member 112 has been moved to the L4 position, the front-wheel drive clutch 50 is in a released state and the 4WD locking mechanism 58 is in an engaged state, as shown in FIG. 4, so the vehicle 10 is in the 4WD running state in the 4WD locked state in the low-speed gear L.

As described above, according to this example embodiment, the transfer 22 is provided with the electric motor 84, the screw mechanism 86 in which the nut member 92 moves in the direction of the first axis C1 by the threaded shaft member 94, which is one of the screw members, of the threaded shaft member 94 and the nut member 92 that are supported by the rear-wheel side output shaft 44 and screw together, being rotatably driven by the electric motor 84, the first transmitting mechanism 88*a* that transmits the linear motion of the nut member 92 of the screw mechanism 86 to the front-wheel drive clutch 50, the fork shaft 102 that is arranged parallel to the rear-wheel side output shaft 44 and is supported so as to be able to move in the direction of the third axis C3, the fork 104 that is connected to the fork shaft 102 and transmits the moving force of the fork shaft 102 to the high-low switching mechanism 48, and the amplifying link mechanism 106 that is connected to the nut member 92, and amplifies the amount of movement D1 of the nut member 92 in the direction of the first axis C1, and transmits the amplified amount of movement to the fork shaft 102. The high-low switching mechanism 48 is configured to switch between the high-speed gear H and the low-speed gear L by the moving force of the nut member 92 in the direction of the first axis C1 that is transmitted by the fork 104. Therefore, high thrust is able to be applied to the front-wheel drive clutch 50 via the first transmitting mechanism 88*a* by the relatively high boost function of the screw mechanism 86. Also, a stroke necessary to operate the high-low switching mechanism 48 via the fork shaft 102 and the fork 104 is able to be obtained by moving the nut member 92 in the direction of the first axis C1 in the screw mechanism 86. As a result, both the switching operation of the high-low switching mechanism 48 and the torque adjustment of the front-wheel drive clutch 50 are able to be performed with the same method, by using the screw mechanism 86 as a conversion mechanism that converts the rotational motion of the electric motor 84 into linear motion. Consequently, the number of parts, the weight, the cost, and the size of the transfer 22 are able to be reduced compared to the related art. Also, the amount of movement D1 of the nut member 92 in the direction of the first axis C1 is amplified and transmitted to the fork shaft 102 by the amplifying link mechanism 106, so the switching responsiveness of the high-low switching mechanism 48 is increased.

Moreover, according to this example embodiment, the amplifying link mechanism 106 is provided with the shift member 112, the amplifying lever 114, and the fixed base 110. The one end portion 112*a* of the shift member 112 is connected to the nut member 92 in a manner that enables movement parallel to the direction of the first axis C1, and the other end portion 112*b* of the shift member 112 is connected to the intermediate portion 114*c* in the longitudinal direction of the amplifying lever 114 in a manner that enables relative rotation around the fourth axis C4 that is orthogonal to the first axis C1. The one end portion 114*a* of the amplifying lever 114 is connected to the fixed base 110 in a manner that enables relative rotation around the fifth axis C5 that is orthogonal to the first axis C1, and the other end portion 114*b* of the amplifying lever 114 is connected to the fork shaft 102 in a manner that enables relative rotation around the sixth axis C6 that is orthogonal to the first axis C1. The amplifying link mechanism 106 amplifies the amount of movement D1 of the shift member 112 in the direction of the first axis C1 to the amount of movement D2 of the fork shaft 102 in the direction of the third axis C3. Therefore, when the nut member 92 is moved in the direction of the first axis C1, and the one end portion 114*a* of the amplifying lever 114 rotates around the fifth axis C5 via the shift member 112, the amount of movement D1 of the shift member 112 in the direction of the first axis C1 is amplified in relation to the ratio of the first distance E1 from the one end portion 114*a* of the amplifying lever 114 to the intermediate portion 114*c* in the longitudinal direction of the amplifying lever 114 to which the other end portion 112*b* of the shift member 112 is connected, and the second distance E2 from the one end portion 114*a* of the amplifying lever 114 to the other end portion 114*b* of the amplifying lever 114, in the amplifying lever 114, and this amplified amount of movement is transmitted to the fork shaft 102.

Also, according to this example embodiment, the transfer 22 is provided with the 4WD locking mechanism 58 that is driven by the high-low switching mechanism 48 and connects the rear-wheel side output shaft 44 and the drive gear 46 together in a manner such that the rear-wheel side output shaft 44 and the drive gear 46 are unable to rotate relative to each other around the first axis C1. The shift member 112 is moved, by the movement of the nut member 92 in the direction of the first axis C1, to one of three positions, i.e., the L4 position in which the low-speed gear L is established in the high-low switching mechanism 48 and the rear-wheel side output shaft 44 and the drive gear 46 are connected together in a manner in which they are unable to rotate relative to each other around the first axis C1 in the 4WD locking mechanism 58, the H2 position in which the high-speed gear H is established in the high-low switching mechanism 48 and the transmission of some of the power of the rear-wheel side output shaft 44 to the drive gear 46 is interrupted in the front-wheel drive clutch 50, and the H4 position in which the high-speed gear H is established in the high-low switching mechanism 48 and some of the power of the rear-wheel side output shaft 44 is transmitted to the drive gear 46 in the front-wheel drive clutch 50. The amplifying link mechanism 106 switches the fork shaft 102 between the L4 position and the H2 position, in response to the shift member 112 of the amplifying link mechanism 106 moving from the rear-wheel side output shaft 44 side to the input shaft 42 side in the direction of the first axis C1. Therefore, the switching responsiveness with which the fork shaft 102 switches between the L4 position and the H2 position is increased by the amplifying link mechanism 106.

Also, according to this example embodiment, the amplifying link mechanism 106 includes the roller-shaped first interlocking pin 116 and the roller-shaped second interlocking pin 118. The longitudinal portion 110*c* of the fixed base 110, the second protruding portions 114*d* and 114*e* of the amplifying lever 114, and the first protruding portions 112*c* and 112*d* of the shift member 112 are configured to each slidingly contact each other at a right angle to the third axis C3 of the fork shaft 102. Portions of the first interlocking pin 116 and the second interlocking pin 118 are housed, in a manner that enables them to move in the direction of the fourth axis C4 of the first interlocking pin 116 and the second interlocking pin 118, in the first through-holes 114f and 114g that pass through the second protruding portions 114d and 114e of the amplifying lever 114. The shift member 112 includes the first recessed portions 112g and 112h that receive the one end portions 116a and 118a of the first interlocking pin 116 and the second interlocking pin 118 from the L4 position to the H2 position. The longitudinal portion 110c of the fixed base 110 includes the second recessed portions 110h and 110i that receive the other end portions 116b and 118b of the first interlocking pin 116 and the second interlocking pin 118 when the shift member 112 passes the H2 position. The amplifying link mechanism 106 is configured to, when the shift member 112 moves in the direction from the L4 position to the H4 position, urge the amplifying lever 114 in the direction of the third axis C3 of the fork shaft 102 by the shift member 112 via the first interlocking pin 116 and the second interlocking pin 118, from the L4 position to the H2 position, and stop the movement of the amplifying lever 114 with the stoppers 110j formed on the longitudinal portion 110c of the fixed base 110, past the H2 position. Therefore, when the shift member 112 moves from the H2 position to the H4 position, the movement of the amplifying lever 114 is stopped by the stoppers 110j, and in conjunction with this, the movement of the fork shaft 102 and the fork 104 is stopped, so when the high-speed gear H is established in the high-low switching mechanism 48, the nut member 92 is moved to the front-wheel drive clutch 50 side, and the linear motion of this nut member 92 is able to be transmitted to the front-wheel drive clutch 50 via the first transmitting mechanism 88a. Also, loss when in 2WD is able to be reduced by providing relatively large clutch clearance with the front-wheel drive clutch 50, when the shift member 112 is in the H2 position, for example.

Also, according to this example embodiment, the front-wheel drive clutch 50 is a clutch that adjusts the transfer torque to the drive gear 46, and this front-wheel drive clutch 50 is a multiple disc clutch. Therefore, continuously variable control of the transfer torque in the front-wheel drive clutch 50 is possible, which in turn makes driving force distribution control to the front wheels 14L and 14R and the rear wheels 16L and 16R that is even better suited to the driving conditions possible.

Moreover, according to this example embodiment, the nut member 92 screws together with the threaded shaft member 94 via the plurality of balls 96. Therefore, the relative rotation between the nut member 92 and the threaded shaft member 94 is smoother, so the power required of the electric motor 84 during operation is stably reduced.

Next, another example embodiment of the present disclosure will be described. Portions common to the first example embodiment described above will be denoted by like reference characters, and descriptions of these portions will be omitted.

Figure 11:
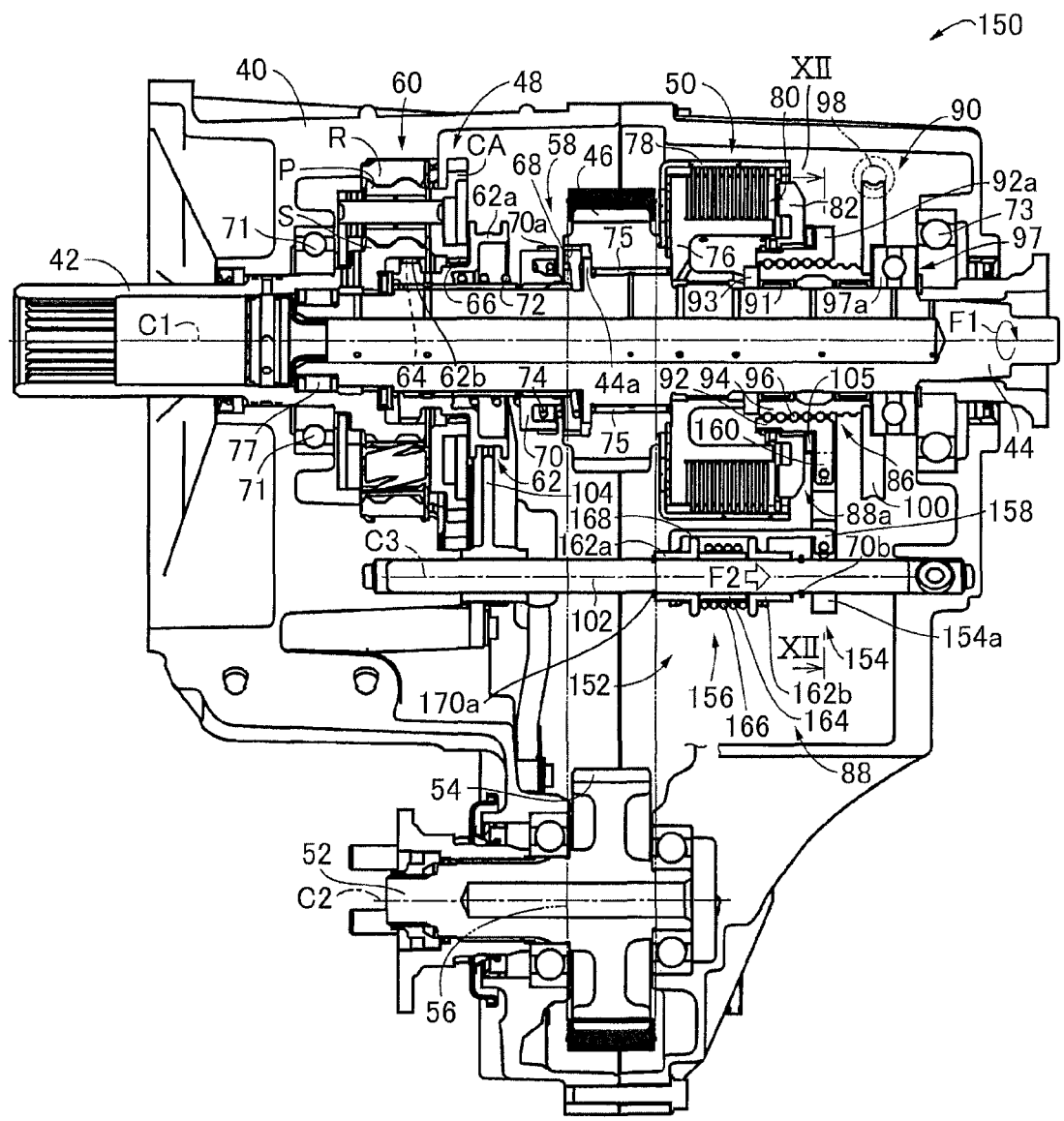
FIG. 11 is a view illustrating a transfer according to another example embodiment of the present disclosure.
Figure 12:
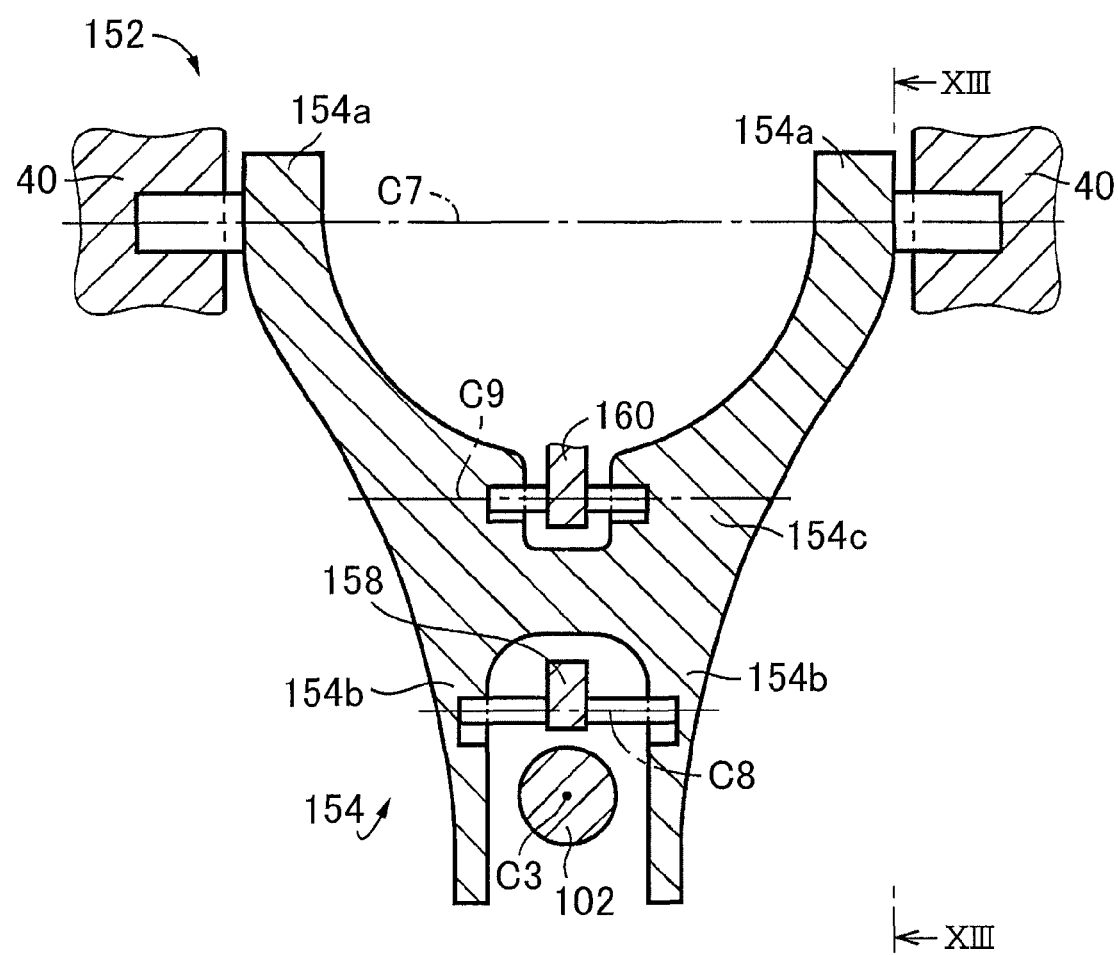
FIG. 12 is a sectional view taken along line XII-XII in FIG. 11.

FIG. 11 is a view illustrating a transfer 150 according to another example embodiment of the present disclosure. The transfer 150 according to this example embodiment differs from the transfer 22 according to the first example embodiment in that an amplifying link mechanism 152 differs from the amplifying link mechanism 106 of the first example embodiment. As for the rest, the transfer 150 is substantially the same as the transfer 22 of the first example embodiment.

The amplifying link mechanism 152 is connected to the nut member 92, and amplifies the amount of movement of the nut member 92 in the direction of the first axis C1 and transmits this amplified amount of movement to the fork shaft 102. The amplifying link mechanism 152 includes an amplifying lever 154 and a standby mechanism 156. As shown in FIGS. 11 to 13B, one end portion 154a of the amplifying lever 154 is connected to the transfer case 40 in a manner that enables relative rotation around a seventh axis C7 that is orthogonal to the first axis C1, the other end portion 154b of the amplifying lever 154 is connected to a first connecting member 158, which is connected to the fork shaft via the standby mechanism 156, in a manner that enables relative rotation around an eighth axis C8 that is orthogonal to the direction of the first axis C1, and an intermediate portion 154c of the amplifying lever 154 is connected to a second connecting member 160, which is integrally connected to the flange portion 92a of the nut member 92, in a manner that enables relative rotation around a ninth axis C9 that is orthogonal to the direction of the first axis C1.

According to the amplifying link mechanism 152 structured in this way, when the threaded shaft member 94 is rotated in the direction of arrow F1 around the first axis C1 by the electric motor 84, and the nut member 92, i.e., the second connecting member 160, is moved in the direction of arrow F2 from the state shown in FIG. 13A, the one end portion 154a of the amplifying lever 154 rotates in the direction of arrow F4 around the seventh axis C7, and an amount of movement D3 of the second connecting member 160 in the direction of the first axis C1, i.e., the amount of movement of the nut member 92 in the direction of the first axis C1, is amplified to an amount of movement D4 of the first connecting member 158, i.e., the fork shaft 102, in the direction of the third axis C3, and the moving force of the nut member 92 in the direction of the first axis C1 is transmitted to the fork shaft 102, as shown in FIG. 13B. Also, when the second connecting member 160 is moved in the direction opposite the direction of arrow F2 from the state shown in FIG. 13B, the one end portion 154a of the amplifying lever 154 rotates in the direction opposite the direction of arrow F4 around the seventh axis C7, and the amount of movement D3 of the second connecting member 160 in the direction of the first axis C1 is amplified to the amount of movement D4 of the first connecting member 158, i.e., the fork shaft 102, in the direction of the third axis C3, and the moving force of the nut member 92 in the direction of the first axis C1 is transmitted to the fork shaft 102, as shown in FIG. 13A.

The standby mechanism 156 includes two flanged cylindrical members 162a and 162b, a cylindrical spacer 164, a spring member 166, and a grasping member 168, as shown in FIG. 11. The two flanged cylindrical members 162a and 162b are arranged around the third axis C3 and are able to slide on the fork shaft 102 in a direction parallel to the third axis C3. The two flanged cylindrical members 162a and 162b are arranged such that a flange provided on one end portion of the flanged cylindrical member 162a faces a flange provided on one end portion of the flanged cylindrical member 162b. The spacer 164 is interposed between the two flanged cylindrical members 162a and 162b. The spring member 166 is arranged in a preloaded state on the outer peripheral side of the spacer 164. The grasping member 168 grasps the two flanged cylindrical members 162a and 162b in a manner that enables the two flanged cylindrical members 162a and 162b to slide in a direction parallel to the third axis C3. The grasping member 168 slides the flanged cylindrical members 162a and 162b on the fork shaft 102 by abutting against the flanges of the flanged cylindrical members 162a and 162b. The length between the flanges of the flanged cylindrical members 162a and 162b when the flanges are both abutted against the grasping member 168 is longer than the length of the spacer 164. Therefore, the state in which the flanges are both abutted against the grasping member 168 is created by the urging force of the spring member 166. Also, the standby mechanism 156 has stoppers 170a and 170b provided on the outer peripheral surface of the fork shaft 102. These stoppers 170a and 170b stop the flanged cylindrical members 162a and 162b, respectively, from sliding apart in the direction parallel to the third axis C3. Stopping the flanged cylindrical members 162a and 162b from sliding apart with the stoppers 170a and 170b enables the linear motion force in the direction of the third axis C3 of the first connecting member 158 that is integrally connected to the grasping member 168 to be transmitted to the high-low switching mechanism 48 and the 4WD locking mechanism 58 via the fork shaft 102.

According to the standby mechanism 156 structured in this way, when the high-speed gear H is established in the high-low switching mechanism 48, i.e., when the outer peripheral teeth 62b of the high-low sleeve 62 are in a position in which they mesh with the high-side gear teeth 64, the length between the flanges of the flanged cylindrical members 162a and 162b is able to be changed between the length when the flanges are both in a state abutted against the grasping member 168, and the length of the spacer 164. Therefore, the standby mechanism 156 allows the nut member 92 to move in the direction parallel to the first axis C1, between a position in which the friction engagement element 80 of the front-wheel drive clutch 50 is pressed on by the piston 82 and a position in which the friction engagement element 80 of the front-wheel drive clutch 50 is not pressed on by the piston 82, while the position of the fork shaft 102 remains in the position in which the outer peripheral teeth 62b of the high-low sleeve 62 mesh with the high-side gear teeth 64.

Heretofore, example embodiments of the present disclosure have been described in detail with reference to the drawings, but the present disclosure may also be applied in other modes.

For example, in the example embodiment described above, the transfer 22 includes the front-wheel drive clutch 50 that adjusts the transfer torque to the drive gear 46, but a clutch, i.e., a dog clutch (a mesh clutch), that transmits or interrupts the transmission of some of the power of the rear-wheel side output shaft 44 to the drive gear 46 may be provided instead of the front-wheel drive clutch 50.

For example, in the first example embodiment described above, with the screw mechanism 86, the nut member 92 is moved in the direction of the first axis C1 of the rear-wheel side output shaft 44 by the threaded shaft member 94 being rotatably driven by the electric motor 84. However, the configuration of the screw mechanism 86 may also be modified such that the nut member 92 is moved in the direction of the first axis C1 of the rear-wheel side output shaft 44 by the nut member 92 being rotatably driven by the electric motor 84, for example. When the nut member 92 is rotatably driven by the electric motor 84, the nut member 92 is supported by the rear-wheel side output shaft 44 via the threaded shaft member 94 in a manner able to move in the direction of the first axis C1 of the rear-wheel side output shaft 44 and able to rotate around the first axis C1, and the threaded shaft member 94 is supported by the rear-wheel side output shaft 44 in a manner unable to move in the direction of the first axis C1 of the rear-wheel side output shaft 44, and unable to rotate around the first axis C1 of the rear-wheel side output shaft 44. Also, when the nut member 92 is rotatably driven by the electric motor 84, the shift member 112 of the amplifying link mechanism 106 is connected to the nut member 92 by the one end portion 112a of the shift member 112 being squeezed by the piston 82 and the flange portion 92a of the nut member 92 via sliding metal, for example, between the one end portion 112a of the shift member 112 and the piston 82, and between the one end portion 112a of the shift member 112 and the flange portion 92a of the nut member 92. As long as the one end portion 112a of the shift member 112 is connected to the nut member 92 in a manner able to move parallel to the direction of the first axis C1, the manner in which the shift member 112 and the nut member 92 are connected is not limited.

Further, in the first example embodiment described above, a ball screw is given as an example of the screw mechanism 86, but the screw mechanism 86 is not limited to this. For example, as long as the screw mechanism 86 is a conversion mechanism that converts the rotational motion of the electric motor 84 into linear motion, the screw mechanism 86 may also be a simple mechanism in which the threaded shaft member 94 and the nut member 92 that directly screw together have been combined, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the first example embodiment described above, the screw mechanism 86 is indirectly connected to the electric motor 84 via the worm gear 90, but the screw mechanism 86 is not limited to this. For example, the threaded shaft member 94 of the screw mechanism 86 and the electric motor 84 may be directly connected without using the worm gear 90. More specifically, the threaded shaft member 94 and the electric motor 84 may be directly connected such that a pinion provided on the motor shaft of the electric motor 84 meshes with gear teeth formed on the threaded shaft member 94.

Further, in the first example embodiment described above, an FR-based four-wheel drive vehicle is given as an example of the vehicle 10 to which the transfer 22 is applied, but the vehicle 10 to which the transfer 22 is applied is not limited to this. For example, the vehicle 10 to which the transfer 22 is applied may also be a front engine front wheel drive (FF)-based four-wheel drive vehicle. Also, the front-wheel drive clutch 50 is a multiple disc clutch, but the present disclosure may also be applied when the front-wheel drive clutch 50 is a single disc clutch.

Moreover, in the first example embodiment described above, an internal combustion engine such as a gasoline engine or a diesel engine, for example, may be used as the engine 12 that is given as an example of the driving force source. Also, another prime mover such as an electric motor, for example, may be used either alone or in combination with the engine 12, as the driving force source. Further, the transmission 20 is any one of a variety of automatic transmissions such as a planetary gear-type stepped transmission, a continuously variable transmission, or a synchronous mesh twin shaft parallel axis-type transmission (including a known DCT), or a known manual transmission. Also, the front-side clutch 36 is an electromagnetic dog clutch, but the front-side clutch 36 is not limited to this. For example, the front-side clutch 36 may also be a type of friction clutch, or a dog clutch that is provided with a shift fork that moves a sleeve in the axial direction, in which the shift fork is driven by an electrically controllable or hydraulically controllable actuator, or the like.

The example embodiments described above are no more than example embodiments. The present disclosure may be carried out in modes that have been modified or improved in any of a variety of ways based on the knowledge of one skilled in the art.

What is claimed is:

1. A vehicle transfer comprising:
    an input shaft;
    an output shaft that is arranged on a common axis with the input shaft;
    an output member configured to output power to a different output destination than the output shaft;
    a clutch configured to transmit or interrupt a transmission of some of the power of the output shaft from the output shaft to the output member, or adjust transfer torque that is transmitted from the output shaft to the output member;
    a motor;
    a screw mechanism that includes a threaded shaft member and a nut member that are a pair of screw members, the screw mechanism being supported by the output shaft; the threaded shaft member and the nut member screwing together; the screw mechanism configured to rotatably drive one of the screw members, of the threaded shaft member and the nut member, with the motor such that the nut member moves in a direction of the common axis;
    a transmitting mechanism configured to transmit a movement of the nut member that is in the direction of the common axis to the clutch;
    a fork shaft that is arranged parallel to the output shaft, the fork shaft configured to move in an axial direction of the fork shaft;
    an amplifying link mechanism that is connected to the nut member and the fork shaft, the amplifying link mechanism configured to amplify an amount of movement of the nut member in the direction of the common axis and transmit the amplified amount of movement to the fork shaft;
    a high-low switching mechanism configured to change a rate of rotation of the input shaft and transmit a resultant rotation to the output shaft, the high-low switching mechanism including a high-speed gear and a low-speed gear; and
    a fork that is connected to the fork shaft, the fork configured to transmit moving force of the fork shaft to the high-low switching mechanism such that the high-low switching mechanism switches between the high-speed gear and the low-speed gear.

2. The vehicle transfer according to claim 1, wherein:
    the amplifying link mechanism includes a shift member, an amplifying lever, and a fixed base;
    one end portion of the shift member is connected to the nut member such that the one end portion of the shift member moves parallel to the direction of the common axis;
    another end portion of the shift member is connected to a longitudinally intermediate portion of the amplifying lever such that the other end portion of the shift member rotates relatively around a first axis that is orthogonal to the common axis;
    one end portion of the amplifying lever is connected to the fixed base such that the one end portion of the amplifying lever rotates relatively around a second axis that is orthogonal to the common axis;
    another end portion of the amplifying lever is connected to the fork shaft such that the other end portion of the amplifying lever rotates relatively around a third axis that is orthogonal to the common axis; and
    the amplifying link mechanism is configured such that an amount of movement of the shift member in the direction of the common axis is amplified and becomes an amount of movement of the fork shaft in the axial direction of the fork shaft.

3. The vehicle transfer according to claim 2, further comprising:
    a locking mechanism configured to connect the output shaft and the output member together in a manner in which the output shaft and the output member are unable to rotate relative to each other around the common axis, the locking mechanism configured to be driven by the high-low switching mechanism, wherein
    the shift member is configured to move to an L4 position of the shift member, an H2 position of the shift member, and an H4 position of the shift member, by the movement of the nut member in the direction of the common axis, the L4 position of the shift member being a position of the shift member in which the low-speed gear is established in the high-low switching mechanism and the output shaft and the output member are connected together in a manner unable to rotate relative to each other around the common axis in the locking mechanism, the H2 position of the shift member being a position of the shift member in which the high-speed gear is established in the high-low switching mechanism and the transmission of some of the power of the output shaft to the output member is interrupted in the clutch, the H4 position of the shift member being a position in which the high-speed gear is established in the high-low switching mechanism and some of the power of the output shaft is transmitted to the output member in the clutch; and
    the amplifying link mechanism is configured to move the fork shaft in response to the shift member moving from the output shaft side to the input shaft side in the direction of the common axis such that the fork shaft switches between the L4 position of the fork shaft and the H2 position of the fork shaft.

4. The vehicle transfer according to claim 3, wherein
    the amplifying link mechanism includes a roller-shaped interlocking pin;
    the fixed base, the amplifying lever, and the shift member are configured to each slidingly contact each other at a right angle to the axis of the fork shaft;
    a portion of the roller-shaped interlocking pin is housed in a through-hole through the amplifying lever such that the roller-shaped interlocking pin moves in an axial direction of the roller-shaped interlocking pin;
    the shift member includes an engaging recessed portion that receives one end portion of the roller-shaped interlocking pin when the shift member is in a position from the L4 position of the shift member to the H2 position of the shift member;
    the fixed base includes an engaging recessed portion that receives another end portion of the roller-shaped interlocking pin when the shift member passes the H2 position of the shift member and is in the H4 position of the shift member;

the fixed base includes a stopper;

the amplifying link mechanism is configured to urge the amplifying lever in the axial direction of the fork shaft with the shift member via the roller-shaped interlocking pin when the shift member is in a position from the L4 position of the shift member to the H2 position of the shift member, when the shift member moves from the L4 position of the shift member to the H4 position of the shift member; and the amplifying link mechanism is configured to stop movement of the amplifying lever with the stopper when the shift member passes the H2 position of the shift member, when the shift member moves from the L4 position of the shift member to the H4 position of the shift member.

5. The vehicle transfer according to claim 1, wherein:

the clutch is either a single disc clutch or a multiple disc clutch; and the clutch is configured to adjust the transfer torque to the output member.

6. The vehicle transfer according to claim 1, wherein the nut member and the threaded screw member screw together via a plurality of balls.

\* \* \* \* \*